United States Patent
Plotkin et al.

(10) Patent No.: US 8,335,915 B2
(45) Date of Patent: Dec. 18, 2012

(54) ENCRYPTION BASED SECURITY SYSTEM FOR NETWORK STORAGE

(75) Inventors: Serge Plotkin, Palo Alto, CA (US); Dan Avida, Belmont, CA (US)

(73) Assignee: NetApp, Inc., Sunnyvale, CA (US)

( * ) Notice: Subject to any disclaimer, the term of this patent is extended or adjusted under 35 U.S.C. 154(b) by 1085 days.

(21) Appl. No.: 10/478,386

(22) PCT Filed: May 14, 2002

(86) PCT No.: PCT/US02/15421
§ 371 (c)(1),
(2), (4) Date: Nov. 17, 2003

(87) PCT Pub. No.: WO02/093314
PCT Pub. Date: Nov. 21, 2002

(65) Prior Publication Data
US 2004/0153642 A1    Aug. 5, 2004

Related U.S. Application Data

(60) Provisional application No. 60/292,088, filed on May 17, 2001.

(51) Int. Cl.
*H04L 9/00* (2006.01)
(52) U.S. Cl. ........ 713/150; 713/193; 380/277; 380/281; 726/2; 726/27; 726/28; 726/29; 705/51; 709/224; 709/225
(58) Field of Classification Search .................. 713/1, 2, 713/188, 194, 150, 193; 380/200, 201, 255, 380/277, 281; 726/2, 27–29; 705/51; 709/224, 709/225
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,588,991 A | 5/1986 | Atalla | 340/825.31 |

(Continued)

FOREIGN PATENT DOCUMENTS
WO    WO-00/52875 A1    9/2000

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner* — April Shan
*Assistant Examiner* — Joseph Pan
(74) *Attorney, Agent, or Firm* — Cesari and McKenna, LLP

(57) ABSTRACT

The presently preferred embodiment of the invention provides an encryption based security system for network storage that separates the ability to access storage from the ability to access the stored data. This is achieved by keeping all the data encrypted on the storage devices. Logically, the invention comprises a device that has two network interfaces: one is a clear text network interface that connects to one or more clients, and the other is a secure network interface that is connected to one or more persistent storage servers. Functionally, each network interface supports multiple network nodes. That is, the clear text network interface supports multiple client machines, and the secure network interface supports one or more storage servers.

45 Claims, 11 Drawing Sheets

U.S. PATENT DOCUMENTS

| | | | |
|---|---|---|---|
| 4,757,533 | A | 7/1988 | Allen et al. |
| 5,065,429 | A * | 11/1991 | Lang ............................. 705/56 |
| 5,150,407 | A * | 9/1992 | Chan ............................. 713/178 |
| 5,161,193 | A | 11/1992 | Lampson |
| 5,175,766 | A * | 12/1992 | Hamilton ....................... 705/71 |
| 5,185,717 | A | 2/1993 | Mori |
| 5,222,137 | A * | 6/1993 | Barrett et al. ................. 380/271 |
| 5,235,641 | A * | 8/1993 | Nozawa et al. ............... 713/193 |
| 5,235,642 | A | 8/1993 | Wobber et al. ................. 380/25 |
| 5,265,159 | A | 11/1993 | Kung |
| 5,677,952 | A | 10/1997 | Blakley, III et al. |
| 5,687,237 | A | 11/1997 | Naclerio |
| 5,720,034 | A | 2/1998 | Case ......................... 395/187.01 |
| 5,754,651 | A * | 5/1998 | Blatter et al. ................. 380/241 |
| 5,870,468 | A | 2/1999 | Harrison |
| 5,931,947 | A | 8/1999 | Burns et al. |
| 5,933,498 | A | 8/1999 | Schneck et al. |
| 5,940,507 | A * | 8/1999 | Cane et al. ................... 713/165 |
| 6,073,237 | A | 6/2000 | Ellison |
| 6,134,660 | A * | 10/2000 | Boneh et al. .................. 713/193 |
| 6,175,924 | B1 | 1/2001 | Arnold ......................... 713/189 |
| 6,185,681 | B1 | 2/2001 | Zizzi ............................. 713/165 |
| 6,185,684 | B1 | 2/2001 | Pravetz et al. ................. 713/182 |
| 6,212,600 | B1 | 4/2001 | Friedman et al. |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,414,884 | B1 | 7/2002 | DeFelice et al. |
| 6,507,911 | B1 | 1/2003 | Langford |
| 6,550,011 | B1 | 4/2003 | Sims, III |
| 6,625,734 | B1 | 9/2003 | Marvit et al. |
| 6,636,966 | B1 * | 10/2003 | Lee et al. ...................... 713/165 |
| 6,684,222 | B1 * | 1/2004 | Cornelius et al. ........... 707/104.1 |
| 6,708,272 | B1 * | 3/2004 | McCown et al. ............. 713/151 |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,868,406 | B1 | 3/2005 | Ogg et al. |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,120,696 | B1 | 10/2006 | Au et al. |
| 7,136,995 | B1 | 11/2006 | Wann |
| 7,146,505 | B1 | 12/2006 | Harada et al. |
| 7,185,192 | B1 * | 2/2007 | Kahn ............................ 713/155 |
| 7,215,771 | B1 | 5/2007 | Hamlin |
| 7,222,228 | B1 | 5/2007 | Stephens et al. |
| 7,240,197 | B1 | 7/2007 | Yamagami et al. |
| 7,260,724 | B1 | 8/2007 | Dickinson et al. |
| 7,340,500 | B2 | 3/2008 | Traversat et al. |
| 7,783,898 | B2 * | 8/2010 | Detrick et al. ................. 713/190 |
| 2001/0054155 | A1 * | 12/2001 | Hagan et al. .................. 713/193 |
| 2002/0046286 | A1 | 4/2002 | Caldwell et al. |
| 2002/0073324 | A1 | 6/2002 | Hsu |
| 2002/0091935 | A1 * | 7/2002 | Smith et al. ................... 713/189 |
| 2002/0114453 | A1 * | 8/2002 | Bartholet et al. ............... 380/44 |
| 2003/0028765 | A1 | 2/2003 | Cromer et al. |
| 2003/0131193 | A1 * | 7/2003 | Kodama et al. ............... 711/114 |
| 2007/0058801 | A1 | 3/2007 | Plotkin |
| 2007/0174634 | A1 | 7/2007 | Plotkin |

OTHER PUBLICATIONS

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," in Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email—Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43, 54-55, 65-67, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15, No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Plotkin et al., "Encryption Based Security System for Network Storage", U.S. Appl. No. 60/292,088, filed May 17, 2001, 28 pages.

Supplementary European Search Report, European Application No. 02734438.1-2212/ 1388061, PCT/US0215421, Applicant: Decru, Inc., Date of Mailing: Oct. 6, 2010, pp. 1-5.

\* cited by examiner

ENCRYPTION BASED SECURITY SYSTEM FOR NETWORK STORAGE

RELATED APPLICATIONS

This application claims priority from PCT Application No. PCT/US02/15421, filed on May 14, 2002, titled ENCRYPTION BASED SECURITY SYSTEM FOR NETWORK STORAGE, by Serge Plotkin et al., which claims priority from U.S. Provisional Application Ser. No. 60/292,088, filed May 17, 2001, titled ENCRYPTION BASED SECURITY SYSTEM FOR NETWORK STORAGE, by Serge Plotkin et al.

BACKGROUND OF THE INVENTION

1. Technical Field

The invention relates to data security. More particularly, the invention relates to an encryption based security system for network storage.

2. Description of the Prior Art

Computers are connected to storage devices such as disks and disk arrays by network connections such as Ethernet, Fibre Channel, SCSI, iSCSI, and Infiniband. Such connections use packet-based protocols to send data, commands, and status information between computers and storage devices. The data stored on such storage devices is often of a proprietary nature, and the owner of such data wishes to prevent unauthorized users from reading or modifying the data.

In the case of networked computer storage, unauthorized users can in many cases gain access to the data stored in such devices. It would be advantageous to provide a system that prevents unauthorized users from understanding the data. It would also be advantageous if such system enables both detection of data modification by unauthorized users. At the same time, to simplify integration of such a device with a plurality of computers and storage devices, it would be desirable if such system operated in a completely transparent fashion, whereby no modification is required to either the computers or the storage devices.

SUMMARY OF THE INVENTION

The presently preferred embodiment of the invention provides an encryption based security system for network storage that separates the ability to access storage from the ability to access the stored data. This is achieved by keeping all (or part of) the data encrypted on the storage devices. Logically, the invention comprises a device that has two network interfaces: one is a clear text network interface that is used to communicate to one or more clients, and the other is a secure network interface that is used to communicate with one or more persistent storage servers. Functionally, each network interface supports multiple network nodes. That is, the clear text network interface supports multiple client machines, and the secure network interface supports one or more storage servers.

The invention is preferably a device, placed in the network, on the data path between the computer and the storage device, which intercepts all the packets that flow between the computer and storage device. The device distinguishes between data, command, and status. The device encrypts, using a key, the data sent from the computer and decrypts the data sent from the storage device, while passing through without modification command and status information.

In an alternative configuration, the device resides on the logical data path. In this case the client computers communicate to it as if it was a storage device (or several storage devices) while the device itself communicates with the storage devices as if it is a client computer.

The device can use a plurality of keys to encrypt and decrypt data, and a methodology to select the key based on user identification, data location on the storage device, file name, permission structure and other factors. Multiple such devices can share some or all keys and key use methodology between them, such that some or all of the data encrypted by one such device can be decrypted by another such device.

Such devices are able to operate in a transparent fashion to both the computers and storage systems that are exchanging data though the devices, such that no modification is required to either computers or storage devices to enable the storage of encrypted data on the storage device, and the subsequent retrieval and decryption of such data.

DETAILED DESCRIPTION OF THE INVENTION

Figure 1:
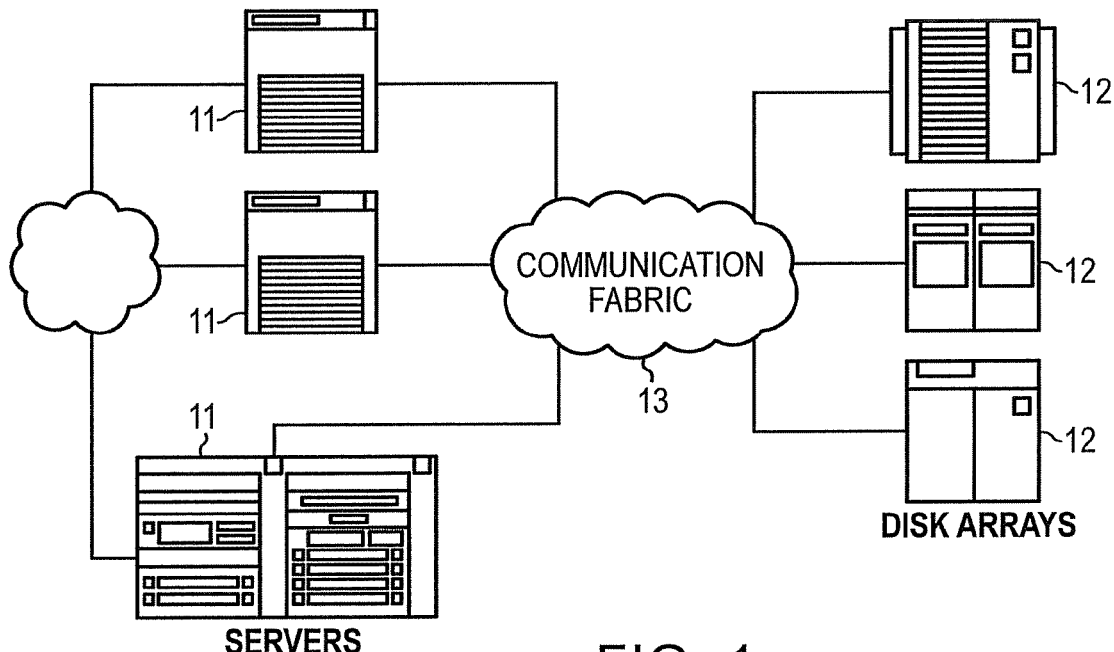
FIG. 1 is a block schematic diagram of a typical networked storage architecture.

The presently preferred embodiment of the invention comprises a network device that resides in a network and that secures data residing in network storage. A typical network storage architecture as is known in the art is shown in FIG. 1.

The servers 11 shown on the left access the storage devices 12 on the right through a communication fabric 13, i.e. a network.

There are two main types of storage architectures to consider in connection with the invention disclosed herein:

In a block-based architecture, the communication between a server and a storage device occurs in terms of sectors or blocks. For example, the server might request "block number 17" from a storage device. In this case, the storage device is usually not aware of the file system used to organize the data on the device. Examples include SCSI over Fibre Channel (usually referred to as SAN), SCSI over IP (iSCSI).

In a Network Attached Storage (NAS) architecture, the access is in terms of files. For example, a server might request to read a specific file from a specific directory. In this case, the storage device is usually responsible for creating, maintaining, and updating the file system. Examples of NAS include NFS and CIFS.

Increasingly, data storage is outsourced. Even when it is not, it is often undesirable to let an information technology group that maintains the storage devices have unrestricted access to all of the data stored on these devices. A key goal of the herein disclosed invention is to separate the ability to access storage (for purposes such as maintenance, backup, sizing, partitioning, etc) from the ability to access the stored data. This is achieved by keeping all (or the sensitive part of) the data encrypted on the storage devices.

Figure 2:
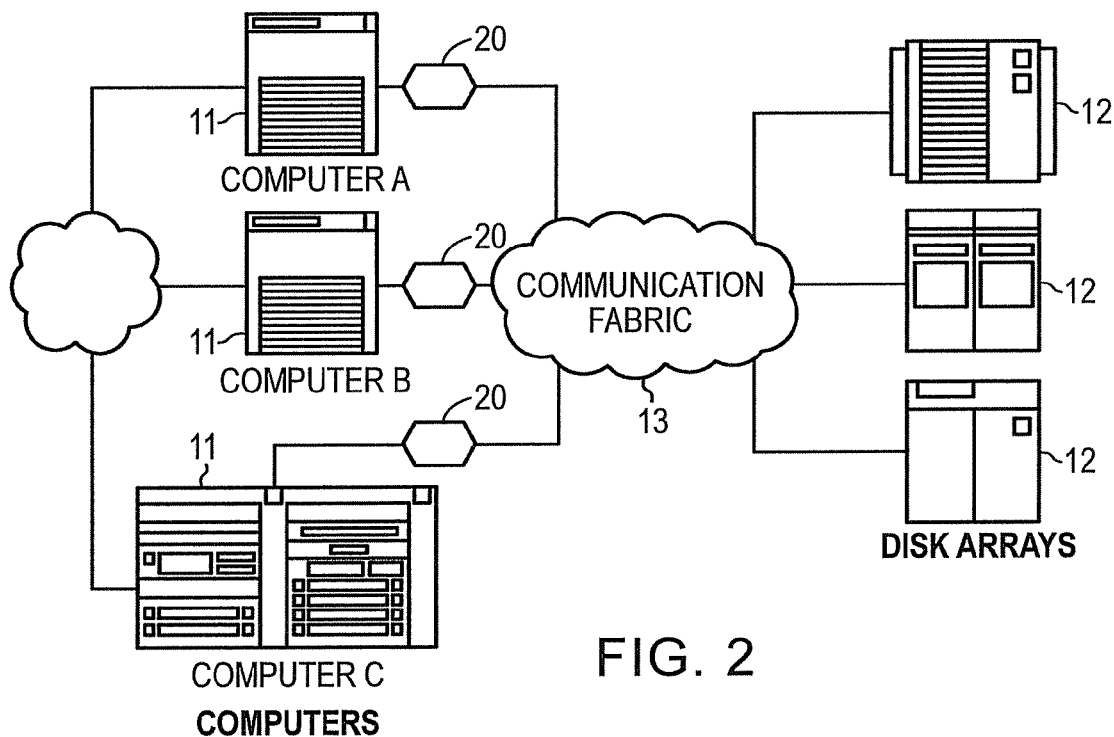
FIG. 2 is a block schematic diagram of an inline deployment architecture according to the invention.

Possible integration of a presently preferred embodiment of the herein disclosed invention in the network is shown in FIG. 2. In this (inline) configuration, all traffic between the servers 11 and the storage devices 12 is routed through a network element 20 that comprises the herein disclosed invention. The invention analyzes the traffic, identifies the payload (data), encrypts/decrypts it (depending on the direction of traffic flow), and forwards the modified traffic.

Figure 3:
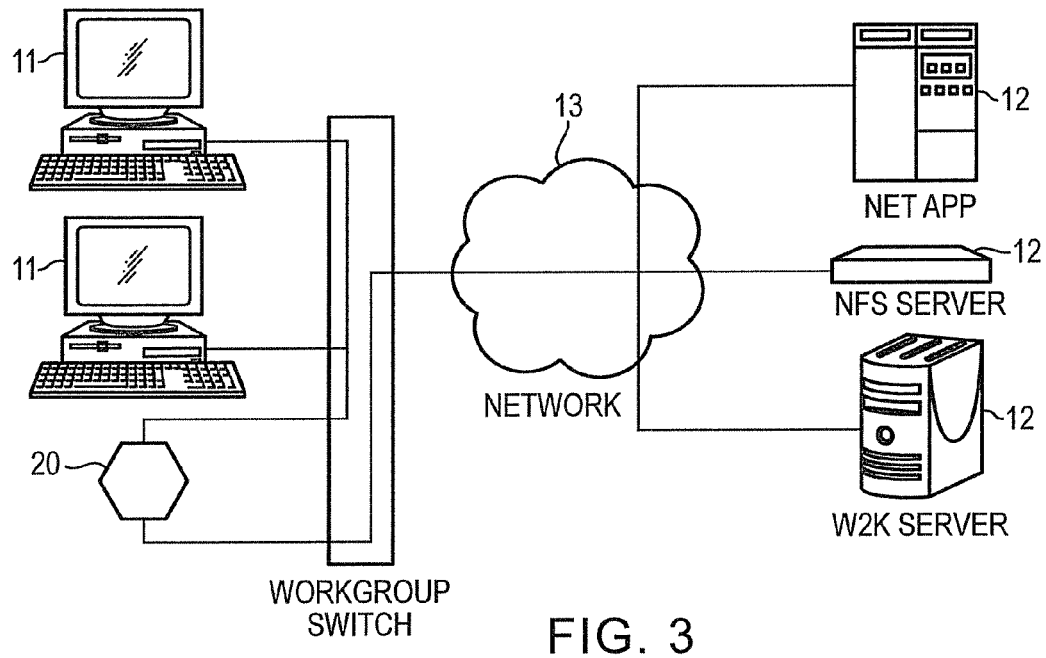
FIG. 3 is a block schematic diagram showing a deployment using a switch according to the invention.

An alternative (switched) architecture is shown in FIG. 3. In FIG. 3, the invention virtualizes some of the storage devices, and the clients 11 can access the devices 12 either directly or through the herein disclosed device 20. Again, all (or part of) the data written to the storage devices through the invention are encrypted.

Logically, the invention comprises a device that has two network interfaces: one is a clear text network interface that connects to one or more clients, and the other is a secure network interface that is connected to one or more persistent storage servers. Functionally, each network interface supports multiple network nodes. That is, the clear text network interface supports multiple client machines, and the secure network interface supports one or more storage servers.

Both in the context of NAS and in the context of SAN, the invention supports active failover and clustering. In particular, in NAS environment, the failover is completely transparent to the client computers and to the storage servers. In cases where multiple invention devices are deployed, all can be controlled globally, from a single point.

The invention supports initial encryption and re-encryption with a different key on-the-fly, without taking the system off-line.

Since the invention decodes all the storage protocols and separates control from payload, it can be set to translate between different storage protocols. For example, it can be setup to mount an NFS share and present it to a client computer as a CIFS share. Another example of translation is between iSCSI and Fibre Channel: the invention can connect to a Fibre Channel array and present it as an iSCSI array.

The invention can be configured to enforce traffic-shaping policies on specific subsets of storage traffic. In particular, it can give higher priority to storage traffic between certain client hosts and storage devices or, alternatively, it can limit such storage traffic to not more than a given percentage of the available storage bandwidth. Iri NAS environment, traffic shaping policies can also take into account specific user names associated with the traffic streams.

The invention seamlessly integrates with existing networking infrastructure. It is possible to attach the invention to a network (NAS or SAN), initialize it, and start working. There is no need to reconfigure the servers. In the "switched" deployment case, the clients might need to be reconfigured to point them to access the storage through the invention instead of accessing it directly. The invention supports industry standard network management interfaces such as SNMP, Web, RMON. I also supports standard physical interfaces such as Gigabit Ethernet, RJ-45 and fibre; Fibre Channel copper and fibre.

NAS deployment and configurations The following discussion describes several configurations for NAS (NFS and CIFS) deployments.

Type-1 Configuration

This is the simplest configuration where the invention is connected to the enterprise network at an arbitrary point. The configuration is shown in FIG. 4.

Figure 4:
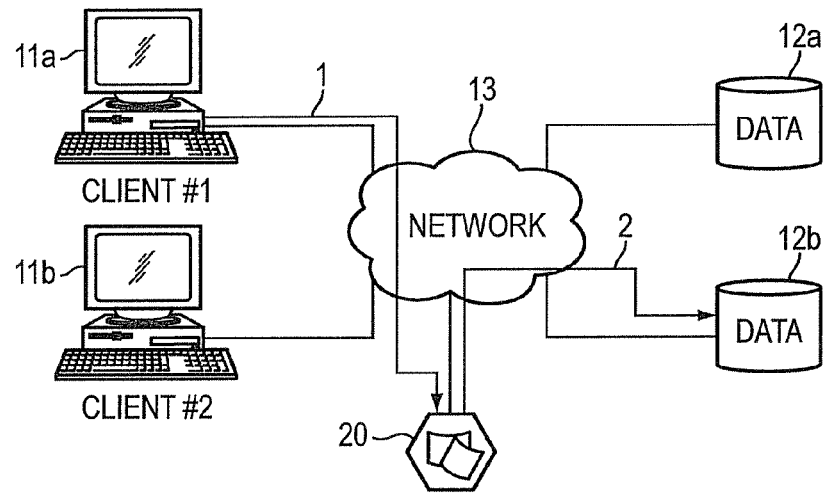
FIG. 4 is a block schematic diagram of a Type-1 configuration according to the invention.

Data from clients 11*a*, 11*b* flows through the enterprise network 13 to the inventive device 20 (shown on FIG. 4 by the numeric designator (1)), is encrypted by the device, and sent further to the disks 12*a*, 12*b* (shown on FIG. 4 by the numeric designator (2)). A read operation proceeds in the reverse direction. Observe that in this case no assumptions are made as to where the inventive device is placed in terms of the enterprise network. In particular, it is not assumed that the device is on the same subnet as NAS clients or servers.

To access a file through the inventive device, the client has to have one of the allowed IP/MAC address combinations (the list of allowed combinations is determined by the administrator). In addition, if desired, the client can first be required to authenticate to the inventive device. Authentication possibilities include user_name/password, NTLM, NTLMv2, Kerberos V5, etc.

Type-2 Configuration

Figure 5:
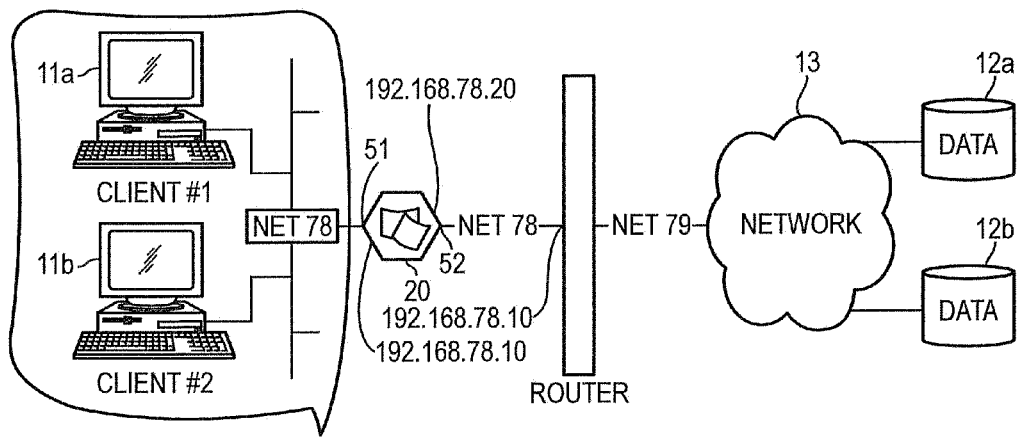
FIG. 5 is a block schematic diagram of a Type-2 deployment according to the invention.

In this configuration (see FIG. 5), the clients 11*a*, 11*b* are connected to the clear text port 51 of the inventive device 20. The other port 52 is connected to the rest of the enterprise network 13. All of the traffic to and from the enterprise network (both storage related and other) passes through the inventive device. The packet filtering setup of the inventive device prevents a rogue client connected to the enterprise network, e.g. Net 79 in the example, to pretend to be connected to the client network (Net 78 in the example). Because the device does not serve decrypted data on the storage port, the rogue client does not have access to clear text data. FIG. 5 shows only a single subnet on the client side. It is straighforward to extend this setup to allow more than a single subnet on the client side.

Type-3 Deployment

Figure 6:
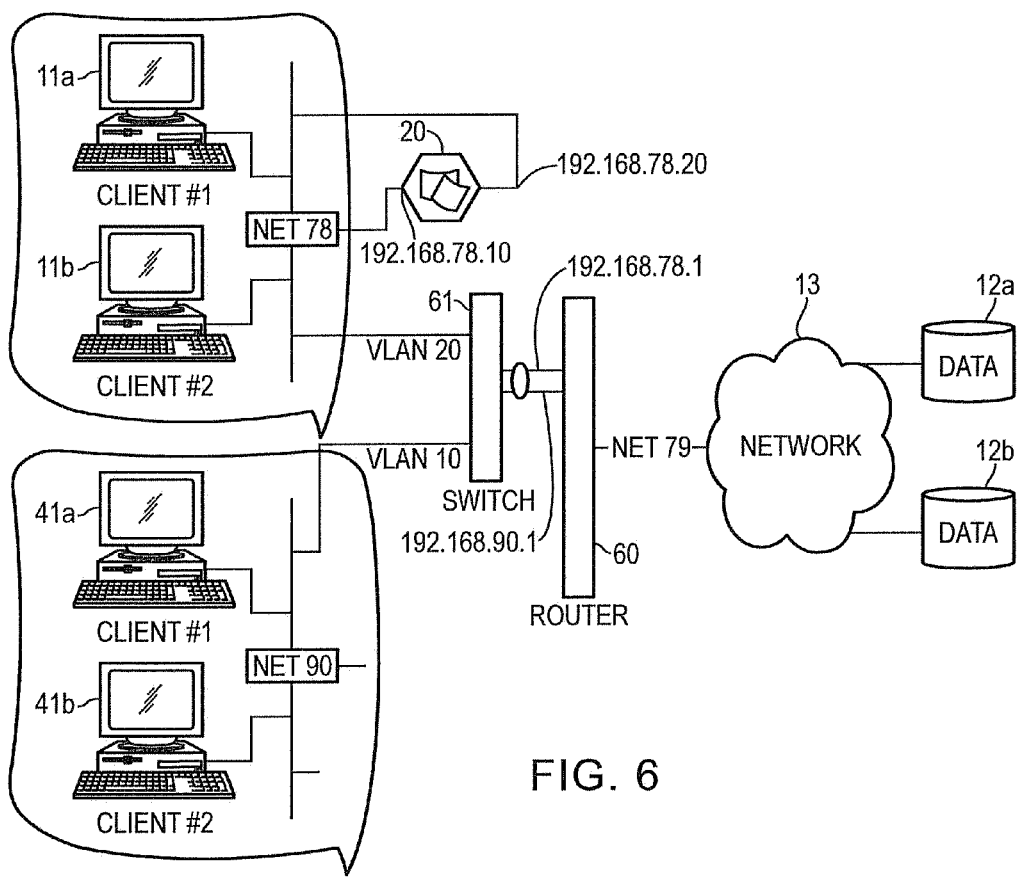
FIG. 6 is a block schematic diagram of a Type 3 deployment according to the invention.

This deployment is similar to the Type-1 deployment. The main difference is that the clients 11*a*, 11*b* are on the same subnet as the inventive device 20 (Net 78 in the example in FIG. 6). The router 60 is assumed setup in a way that prevents a rogue client from pretending to be on Net 78 when it is not physically connected to this subnet.

More precisely, in this example, the two client subnets (Net78 having clients 11*a*, 11*b* and Net 90 having clients 41*a*, 41*b*) are connected through a switch 61 that supports VLANs (802.3p protocol). Net-78 is mapped to VLAN-10 and Net-90 to VLAN-20. The trunk carrying both VLANs connects the switch to the router.

Consider a client that sends a packet, e.g. read request, to the client port of the inventive device. Packet filtering in the inventive device drops all packets with source addresses other than Net 78. If a rogue client spoofs the source IP address, the reply packet does not reach him unless he is physically connected to Net 78 or somehow succeeds in sitting on VLAN 20. Thus, as long as the switch and the router are secured, the reply never reaches the rogue client.

Remote File Sharing

Figure 7:
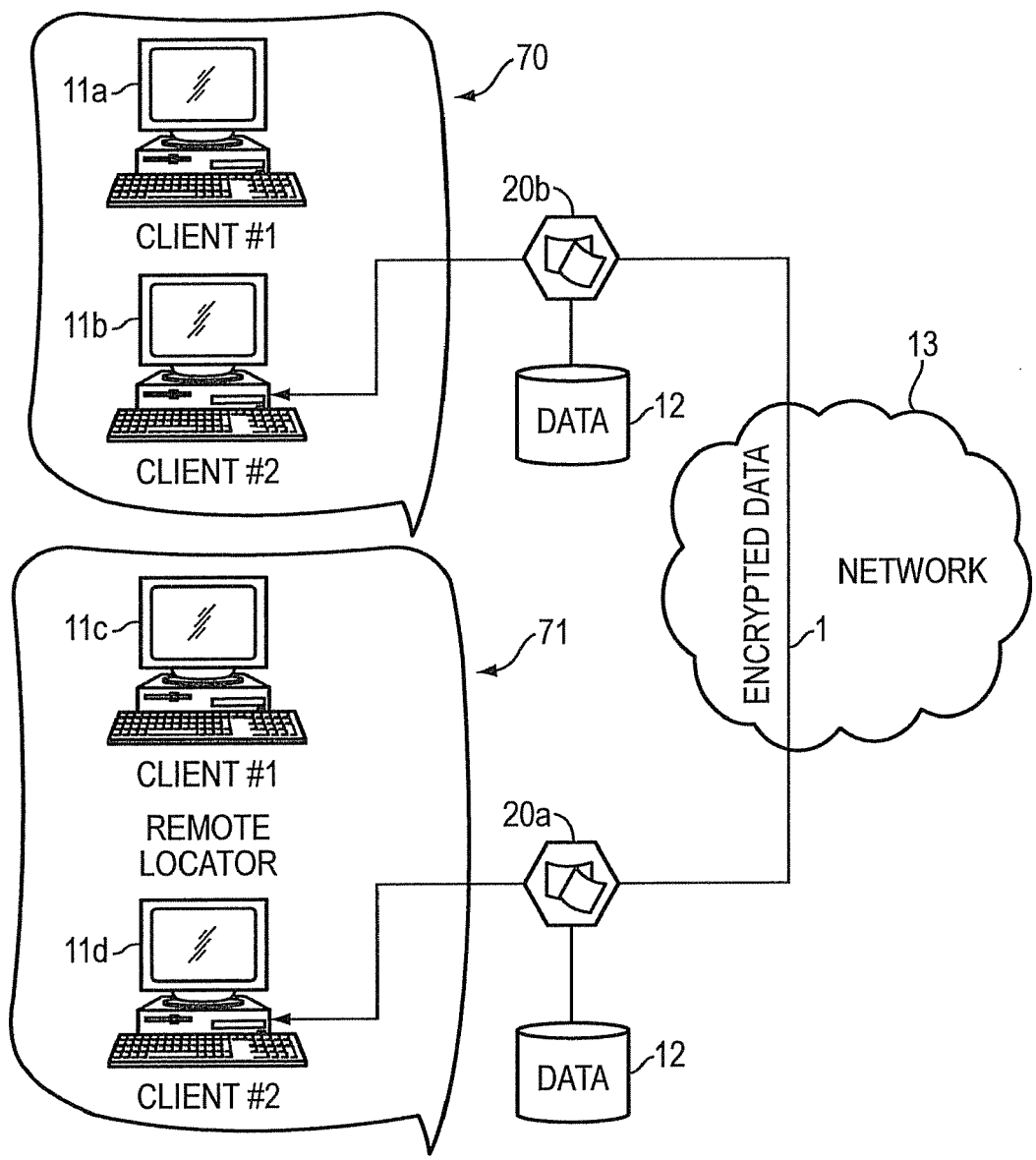
FIG. 7 is a block schematic diagram showing remote data sharing in NAS according to the invention

A basic setup for remote file sharing is shown in FIG. 7. The example shows one main location 70 ("Headquarters") and one remote location 71. A similar setup is possible for multiple remote locations. The clients 11*c*, 11*d* at the remote location see the inventive device 20*a* as a file server. They access the files presented by the inventive device in the same way as they accesses any other NFS or CIFS server.

When a client in the remote location is trying to read a file from the Headquarters server, the following sequence of events occurs:
1. First, the client is required to authenticate to the (remote) inventive device 20*a*. The authentication is performed in exactly the same way as when the NAS servers are directly accessed by the inventive device.
2. If the authentication is successful, the remote device packages the request and forwards it through an IPSEC tunnel to the headquarters device 20*b*. In this example, it is assumed that the devices 20*a* and 20*b* have already authenticated and have created an IPSEC tunnel between them.
3. Upon receiving the request, the headquarters device 20*b* checks whether the remote device has the authority to execute the request.
4. If the authority exists, headquarters device 20*b* reads the data from the NAS server, packages it appropriately, and forwards it through the IPSEC tunnel (shown by the numeric designator (1) on FIG. 7). Note that it does not decrypt the data.

Other operations such as write, create file, are executed in a similar way. When headquarters clients try to access data from the remote location, the roles of headquarters/remote are reversed.

From the administrative perspective, the permissions are set in the following way:
1. First, Cryptainers that are accessible by the specific remote device are identified.
2. Then, the administrators of the remote devices define users that can access the Cryptainers.

Figure 8:
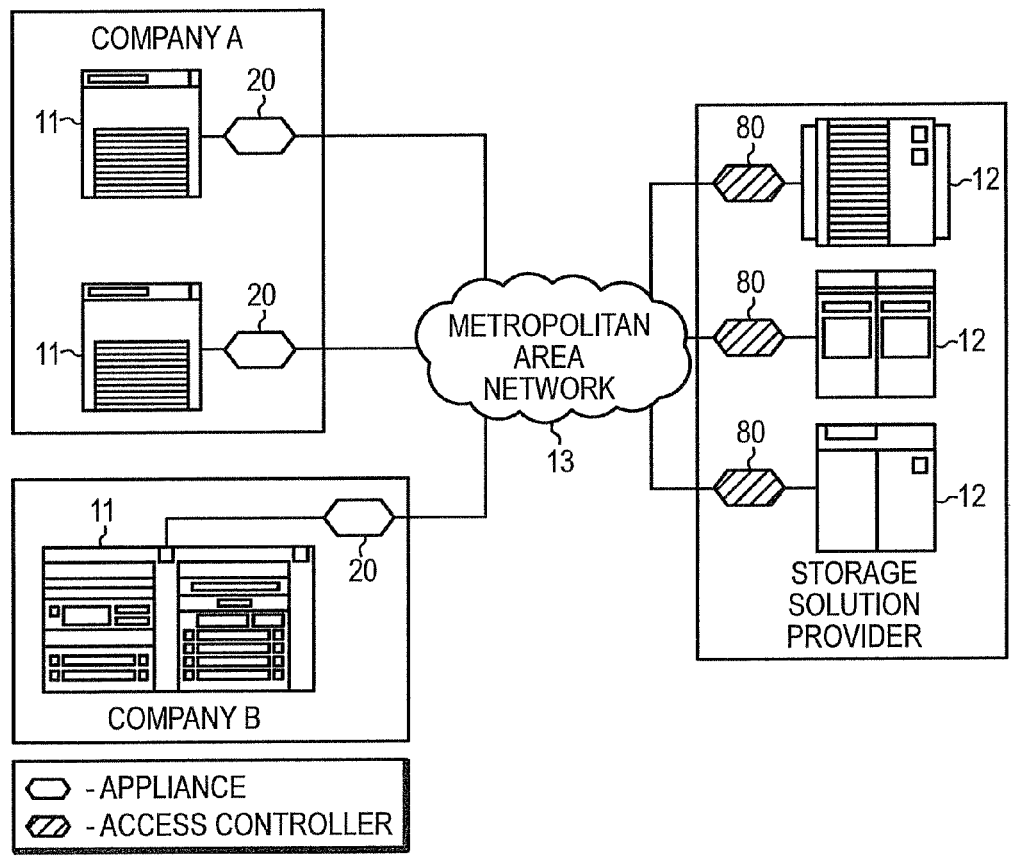
FIG. 8 is a block schematic diagram of an device and access controller configuration according to the invention.
Figure 9:
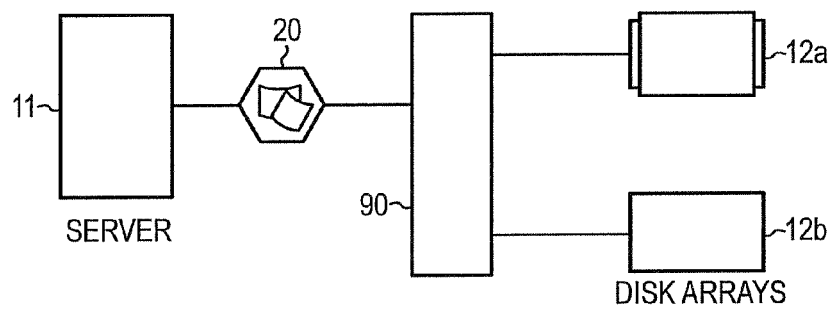
FIG. 9 is a block schematic diagram of a direct-connect configuration according to the invention.

If in the above example the headquarters does not have any clients, the associated inventive device does not need to have any Cryptainer keys. In this case it serves only as an access controller. This setup is shown in FIG. 8, in which the inventive device 20 operates in connection with access controllers 80.

Secure Remote Mirroring

The invention further comprises a device for NAS that supports private and shared remote secure mirroring. The architecture is described in FIG. 12, which shows two companies connecting through a network to storage. Company A has two clients 11*a* and 11*b*, while Company B has a single client 11*c*. Company A has two inventive devices 20*a* and 20*b* through which it connects to the shared storage, while Company B has a single device 20*c*. Inventive device 20*d* serves as access controller in this setup, serving data only to devices 20*a*, 20*b*, and 20*c*; it does not decrypt the data. Remote mirror storage device 120 is connected to a special port on the inventive device 20*c* and serves as a private (non shared) mirror of Company B. Storage device 121 is connected to a similar port of inventive device 20*d* and can be setup to serve as a shared mirror for both companies. SBecause the data stored on this mirror are encrypted with keys available only to the inventive devices residing in the corresponding companies, one company can not read other company's data even though they share the mirror.

SAN Deployment and Configurations

Direct-connect Configuration

Single-switch Solution

Figure 10:
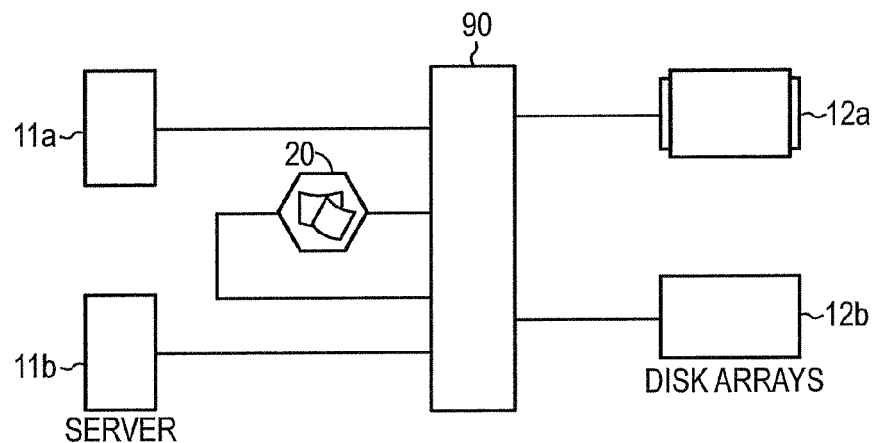
FIG. 10 is a block schematic diagram of a single switch solution according to the invention.

A single-switch solution is shown in FIG. 10. Assuming the switch 90 (or hub) is not zoned, the client sees both raw (original) disks and disks through the inventive device.

Multiple-switch Solution

Figure 11:
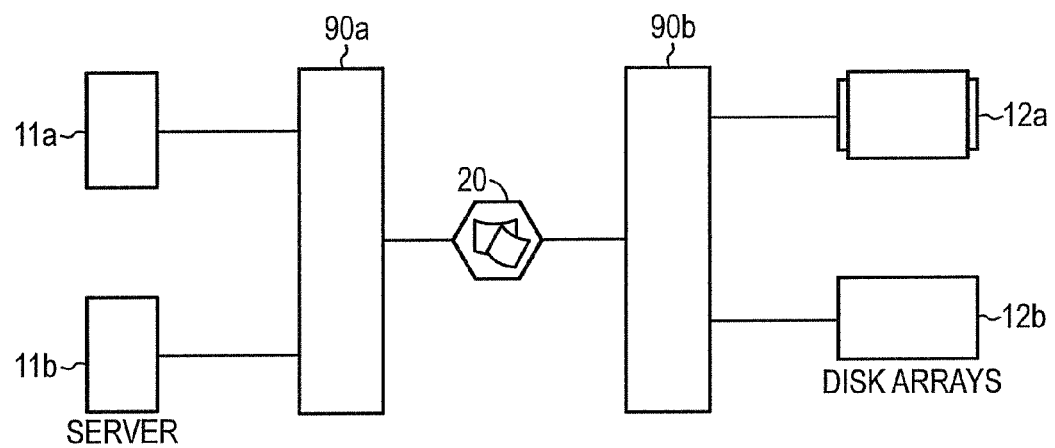
FIG. 11 is a block schematic diagram of a dual switch or zoned single switch solution according to the invention.

In this configuration (FIG. 11), the servers do not see disks directly. The only way they can access the disk is through the inventive device. For all practical purposes, the same configuration can be achieved by zoning a single switch, instead of using two switches 90*a*, 90*b*. In this case, ports in one zone are used to connect the servers and the server side port of inventive device, while the other zone is used to connect the disk arrays and the storage side port of the inventive device.

Secure Remote Mirroring

In all of the SAN configurations above, the data on disk arrays are encrypted. Any mirroring solution can now be used to mirror the data to an offsite location. Because the data are encrypted, security requirements on the offsite location are reduced. An alternative is to use a special version of the inventive device that supports mirroring directly, as it is shown in FIG. 12.

Figure 12:
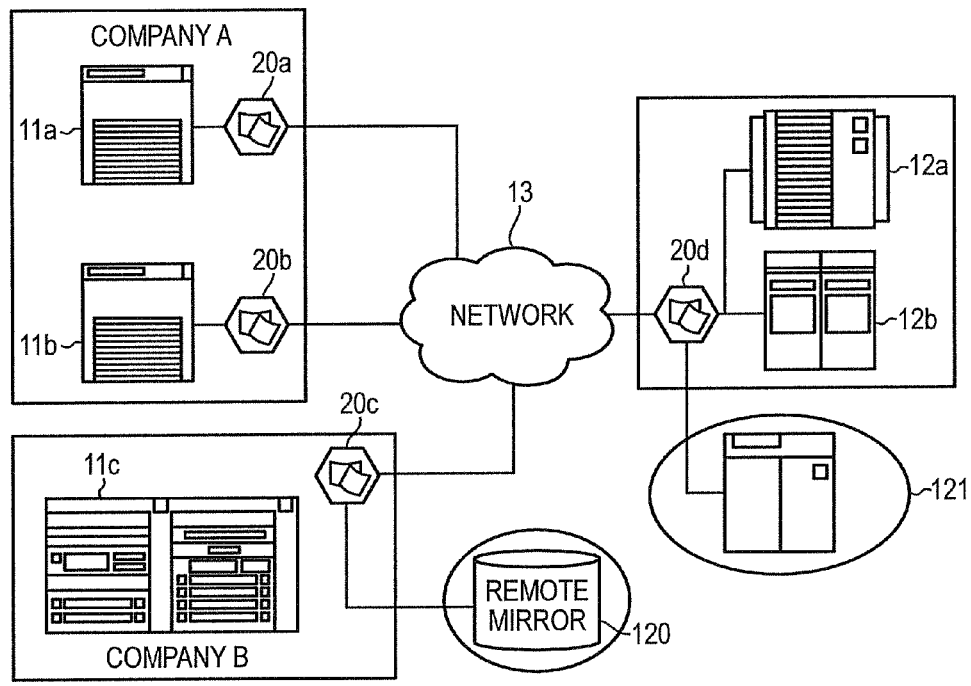
FIG. 12 is a block schematic diagram showing remote mirroring for private and shared disaster recovery according to the invention.

FIG. 12 shows two companies connected to a shared storage site through a fibre channel network. Both companies use the shared mirror facility 121. Because they do not share the keys, neither company can access the data of the other one. In addition, company B is shown to have a private mirror 120 as well.

Hardware Configuration

Figure 13:
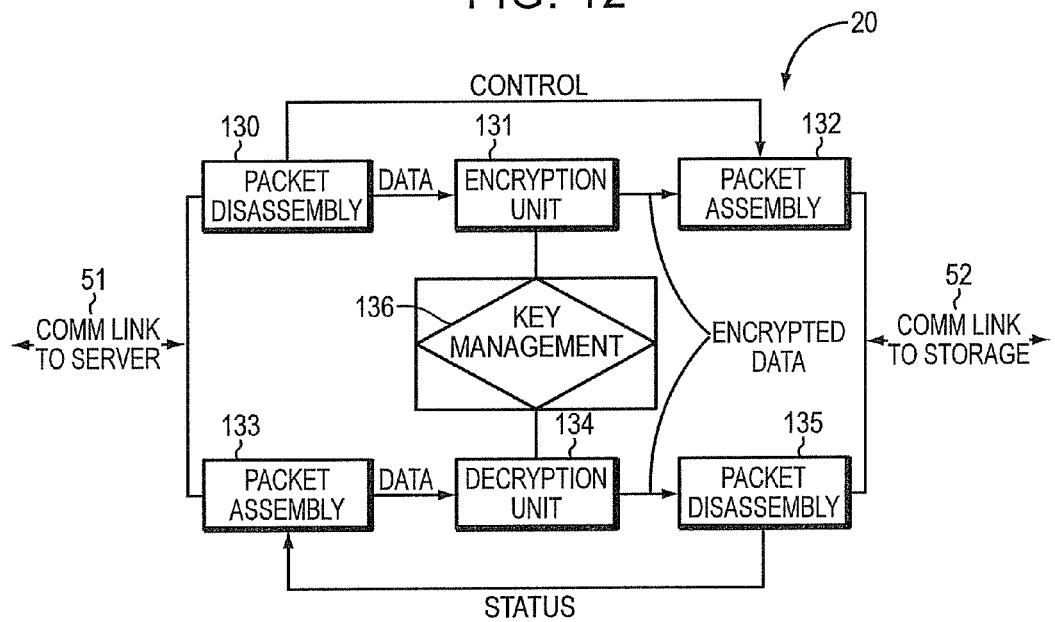
FIG. 13 is a block schematic diagram of an device according to the invention.

A block schematic diagram of the inventive device 20 is shown in FIG. 13. Storage traffic packets are disassembled by a disassembly modules 130, 135 the payload is encrypted or decrypted by respective modules 131, 134 based on the command, i.e. read/write, and in view of key management module 136, the result is assembled back into a legal packet by an assembly module 132, 133 and sent forward.

Figure 14:
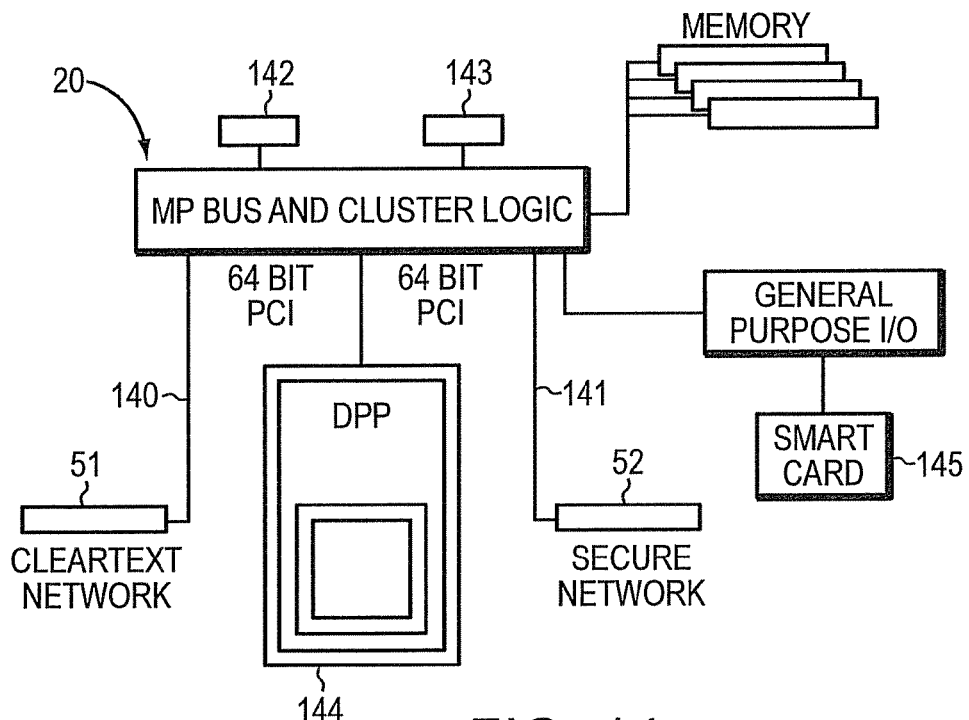
FIG. 14 is a block schematic diagram of a hardware configuration of an device according to the invention.

A hardware configuration of the inventive device is shown in FIG. 14. The presently preferred embodiment of the invention is a device that is based on a standard dual-CPU 142, 143 architecture with dual PCI buses 140, 141. All of the encryption/decryption operations are done inside the Packet Processor, DPP 144.

The only two places where secret data is stored in the system is inside DPP and inside the system Smart Card 145.

Cryptainers

The ACL management and permissioning is done in terms of "cryptainers". In the context of SAN, cryptainer can be, for example, an actual disk, a region on a disk, or several regions on one or more disks. In context of NAS, cryptainer is a collection of files and directories. The inventive device offers users and administrators a mechanism for creating secure Cryptainers. The following discussion describes details of a presently preferred implementation and method for creating Cryptainers in the context of NFS and CIFS.

NFS Cryptainers

Introduction

In general, from the user perspective, a Cryptainer behaves as a physical device in a sense that it is forbidden to move files (mv) from one device to another and hard-link files across devices. By "move is forbidden", we mean that the move will involve actual copy of the data followed by deletion of the original.

Assumptions Regarding Setup

In the following discussion, several assumptions are made:
1. The inventive NFS device is installed with NFSBOX as the DNS name for the client-side interface.
2. The clients are able to reach this interface through the networking infrastructure.
3. The NFS server(s) are reachable from the server interface.
4. A management workstation is connected to the client side of the device and the appropriate software is installed.
5. Users, clients, and servers were defined by the administrator through a management interface.
6. Servers are allowed to export their shares to the server-side interface of the inventive device (NFSBOX).
7. There are two servers: Srv1 exports Srv1:/srv1/home/a, Srv1:/srv1/home/b; Srv2 exports Srv2:/export1.
8. The inventive device is set to export all of the above three shares.
9. Every share exported by the inventive device has a name defined by the administrator.

During the setup, the user is encouraged to use canonical names for the exported shares:

NFSBOX:/Srv1/home/a,
NFSBOX:/Srv1/home/b,
NFSBOX:/Srv2/export1.

The administrator is able to use arbitrary names. To make the description as general as possible, the use of non-canonical names is assumed, even though this may not be a preferred practice.

In particular, in the following, it is assumed that the names are:

NFSBOX:/Srv1/home/a,
NFSBOX:/home/b,
NFSBOX:/export.

Note that, in this example, the names of the exported shares are independent of their original names, which may not be a good IT practice.

It is assumed that the client has mounted the shares exported by device on /decru/a, /decru/b, /decru/c.

Working with Clear Text Data

The mounts /decru/a,b,c behave exactly as regular NFS mounts. The user can create directories, create files, and move files from one directory to another as long as both are under the same mount point.

Creating Cryptainers

A Cryptainer can be created by the user through CLI or a user-GUI. The process of the creation is described below. There are two main choices:

An existing directory is converted to become a Cryptainer. For example, the user has a directory in /decru/a/examples/dir1. After the conversion, the dir1 directory becomes the new root of a Cryptainer. All existing data in dir1 is encrypted.

A new Cryptainer is created in an existing directory. For example, assuming /decru/a/examples exists, the user can create /decru/a/examples/dir2. A new directory, dir2, is created and ready for use as a Cryptainer. Any new file created in dir2 or copied there is immediately encrypted. During creation of a new Cryptainer, the user-GUI suggests to the user that a distinctive name be given to the Cryptainer.

Comments

Although it is possible to create nested cryptainers, in the following discussion we assume that nesting is not allowed.

Initially, a Cryptainer is constructed with access rights given only to the user creating it—"owner". It is possible to pass ownership to another user.

The process of changing the access rights and further securing the Cryptainer with a password or a smart card is described below.

During creation of the Cryptainer the user can choose whether the encryption includes file names and directories.

In the preferred embodiment, the Cryptainer name is always clear text.

Working with Cryptainers

The user sees a Cryptainer as a regular directory. For performance reasons, there are several restrictions on operations involving Cryptainers. In general, the restrictions are the same as if a Cryptainer is a separate mount point of a share:

It is impossible to "mv" Cryptainers from one share to another.

It is impossible to "mv" a file or a directory structure across a Cryptainer boundary.

It is impossible to hard-link across Cryptainer boundary.

Implementation

General assumptions and requirements:
1. Unix users are assumed to use NFS file servers.
2. Restrictions on number of Cryptainers, users, shares, are discussed below.
3. The user can apply all the regular file manipulation operations to directories and files within a Cryptainer. These operations include: mv, cp, rm, rmdir.
4. In UNIX there is no inheritance of ACLs; each directory/file has its own ACL settings. Accessing a file or a directory requires access rights to all the directories above it. Same for Cryptainers.
5. The solution supports common backup utilities and configurations.
6. Both initial encryption of a non-empty directory and re-encryption of an existing Cryptainer is supported.
7. Power failure of the device does not result in loss of data even during re-encryption.
8. Users should be able to recover backup and recover Cryptainers.
9. A Cryptainer can be recovered to a destination different from the original destination.

Re-encryption—it is not always the case that the initiating user has the appropriate permissions to read and write all the files. The system checks that the user is the owner of all files in a Cryptainer to initiate re-encryption. Same restriction for initial creation of a Cryptainer from non-empty directory.

Re-encryption is done in-place.

Byte range locking during re-encryption—while a specific file is being re-encrypted, accesses by clients to this file are allowed.

NFS Implementation

Framework

Cryptainer keys (CK) are used to encrypt data, filenames and directory names within a given Cryptainer.

The first block of each file contains:

Cryptainer Handle (CryptainerID) in plain-text

Two random values R1, R2 encrypted with the CK

Additional administrative information

Creation of a new Cryptainer results in creation of a directory with the Cryptainer name and a .decru file in this directory with meta-data about the Cryptainer. For example, creating a new Cryptainer named /decru/a/examples/dir2 results in creation of a directory named NFSBOX:/Srv1/home/a/examples/dir2.

Conversion of an existing directory into a Cryptainer leaves the files where they are on the server in terms of the directory path, encrypts them, and creates the .decru file under the root name. The files are encrypted in-place and hence their NFS handles are not changed in this process.

To improve performance, one might add .decru files with appropriate metadata in any one of the directories.

The client can neither read nor delete the decru files.

Use Cases
Adding Shares to the Device Export List
This step must be completed before Cryptainers can be created
1. The administrator provides the server name
2. The Device Manager adds the server to the list of virtualized servers
3. The Device Manager displays a list of shares for the server
4. Administrator selects shares to be exported through the inventive device
5. The Device Manager notifies the NFS Mount proxy of the new share information Creating a Cryptainer
1. Using the management tool (either Web or CLI-based), the user selects an existing share
2. User enters a path and the name of the new Cryptainer
3. The Device Manager creates a new CryptainerID for the new Cryptainer
4. The Device Manager gives the NFS Proxy (NP) the share, path, Cryptainer name and the CryptainerID and asks the NP to create the new Cryptainer directory
5. The NP creates the Cryptainer directory (un-encrypted).
6. The NP informs the Device Manager upon completion and asks the DPP for a new Cryptainer Key. (It is returned encrypted)
7. The CryptainerID is stored in the .decru file Assigning Permissions on a Cryptainer
1. The owner of the Cryptainer using the admin tools asks the Device Manager to edit permissions on the Cryptainer.
2. The updated information is stored in the Configuration DB (CDB).

Client Procedures
Client procedures can be grouped into three categories for the purpose of determining a CryptainerID:
  1. Procedures that take a file handle to an existing object:
  GETATTR Get file attributes
  SETATTR Set file attributes
  ACCESS Check access permissions
  READLINK Read from symbolic link
  READ Read from file
  WRITE Write to file
  COMMIT Commit cached data
  2. Procedures that take a file handle to a parent directory and a name:
  LOOKUP Lookup filename
  CREATE Create file
  MKDIR Create Directory
  SYMLINK Create symbolic link
  MKNOD Create a special device
  REMOVE Remove File
  RMDIR Remove Directory
  READDIR Read from Directory
  READDIRPLUS
  3. Procedures that take multiple file handles:
  RENAME Rename File or Directory
  LINK Create Link to an Object The preferred procedure for determining the CryptainerID given a file handle to an existing object is:
1. The user provides a file handle and data
2. The NP looks in the file handle cache to determine the CryptainerID
3. If the file handle is not in the cache, the NP reads the file meta-data (first block of the file) and gets the CryptainerID
4. The NP passes the user's credentials+CryptainerID to the Device Manager
5. The Device Manager checks the ACL and sends back the Cryptainer Key (CK) and a permission bit mask
6. The CK, the random values, and the data are sent to the DPP for encryption if the operation requires encryption or decryption The procedure for determining the CryptainerID for an object given a parent directory and name is:
1. The client provides a file handle to parent directory and a filename
2. The NP looks in the file handle cache to determine the CryptainerID
3. If not found, the NP looks for the .decru file in parent directory (handle to this directory was given) and extracts the CryptainerID if file found. If the .decru file is missing the NP walks up the directory tree until it reaches the root directory, each time looking for .decru file and checking the directory handle against cache. If neither .decru found nor cache hit, the original file is assumed to be in clear text. Otherwise the CryptainerID is extracted either from the cache or from the .decru file.
4. To improve performance, the system can maintain a cache data structure that holds all of the paths to Cryptainers and all of the file handles for the directories on these paths.

Creating a New File
1. CryptainerID of the directory is obtained using the algorithm above
2. The NP passes the user's credentials+CryptainerID to the Device Manager
3. The Device Manager checks the ACL and sends back the Cryptainer Key (CK, encrypted with Master Key) and a permission bit mask
4. The NP asks the DPP for 2 random values (file keys)
5. The NP sends the file name to DPP to be encrypted using the CK and creates the file
6. The NP writes the first record that contains Cryptainer ID and the encrypted R1/R2 values and some additional administrative information.
7. A handle to the file is returned to the user and saved in temporary cache The procedure for RENAME—Moving a File (mv) or directory
1. The user provides a file handle to the source directory and source name and a file handle to the destination directory and a destination name
2. The NP uses the procedure above to find CryptainerIDs for both source and the destination
3. The CryptainerID of the destination directory is compared to the CryptainerID of the source directory
4. If same CryptainerID and if NFS allows a move, then a regular move is done
5. If NFS doesn't allow the move, the move is not allowed
6. If Cryptainer handle is different or if a move is attempted clear—>Cryptainer or Cryptainer—>clear the operation fails The Procedure for LINK—Create Hard Link
1. CryptainerIDs of source and destination are found.
2. Link created only if both are clear text or both are in the same Cryptainer.

CIFS Cryptainers

The following discussion describes a preferred implementation method for the CIFS Proxy (CP) behavior. To make the description more specific, several assumptions are made:

- CIFS device is installed with CIFSBOX as the DNS name for the client-side interface. (This name can be arbitrary legal DNS name, CIFSBOX is used just as an example)
- The clients are able to reach this interface through the networking infrastructure.
- The CIFS server(s) are reachable from the server interface.
- A management workstation is connected to the client side of the device and the appropriate software is installed.
- Users, clients, and servers were defined by the administrator through a management interface.
- Servers are allowed to export their shares to the server-side interface of the inventive device.
- There are two servers: Srv1 with shares \\Srv1\share-a, \\Srv1\share-b; Srv2 with shares \\Srv2\share.
- The inventive device is set to export all of the above three shares.
- Every share exported by the inventive device has a name defined by the administrator.

During the setup, the user is encouraged to use canonical names for the exported shares:

\\CIFSBOX\Srv1_share-a
\\CIFSBOX\Srv1_share-b
\\CIFSBOX\Srv2_share.

The administrator can use arbitrary names. To make the description as general as possible, the use of non-canonical names is assumed, even though this may not be a good practice.

In particular, in the following, it is assumed that the names are:

\\CIFSBOX\a
\\CIFSBOX\b
\\CIFSBOX\c

Note that in this example the names of the exported shares are independent of their original names, which is may not be a good IT practice.

It is assumed that the client has mounted the shares exported by device on F:, G:, H:.

Working with Clear Text Data

The mounts \\CIFSBOX\a,b,c behave exactly as regular CIFS mounts. The user can create directories, create files, and move files from one directory to another as long as both are under the same mount point. Moves from one share to another share on device are converted by the client into copies. In particular, this is true when using drag-and-drop in Windows Explorer. The command line "move" is converted into a copy+delete.

Creating Cryptainers

A Cryptainer can be created by the user through CLI or a user-GUI. The process of the creation is described above. There are two main choices:

1. An existing directory is converted to become a Cryptainer. For example, the user might have a directory \\CIFSBOX\a\dir1. After the conversion, the dir1 directory becomes the new root of a Cryptainer. All existing data in dir1 are encrypted.
2. A new Cryptainer is created in an existing directory. For example, assuming \\CIFSBOX\a\examples exists, the user can create \\CIFSBOX\a\examples\dir2. A new directory, dir2, is created and ready for use as a Cryptainer. Any new file created in dir2 or copied there is immediately encrypted. (The file name is encrypted if user sets "encrypt file names" property during creation of the Cryptainer.)

During creation of a new Cryptainer, Decru user-GUI suggests to the user that a distinctive name be given to the Cryptainer.

Comments

Although it is possible to support nested Cryptainers, the assumption in the following discussion is that they are not supported.

Initially, a Cryptainer is constructed with access rights given only to the user creating it, the "owner". Ownership can be passed to a different user using CLI or user-Gui.

The process of changing the access rights and further securing the Cryptainer with a password or a smart card is described is subsequent sections.

During creation of the Cryptainer, the user can choose whether the encryption includes file and/or directory names.

The Cryptainer name is always clear text.

Working with Cryptainers

The user sees a Cryptainer as a regular directory. There are several restrictions on operations involving Cryptainers.

It is impossible to move (as opposed to "copy") Cryptainers from one share to another.

It is impossible to "mv" a file or a directory structure across a Cryptainer boundary.

Implementation

General Assumptions and Requirements

Windows users are assumed to use CIFS file servers.

Restrictions on number of Cryptainers, users, shares, are discussed elsewhere.

The user is able to apply all the regular file manipulation operations to directories and files within a Cryptainer.

The solution supports common backup utilities and configurations.

Both initial encryption of a non-empty directory and re-encryption of an existing Cryptainer is supported.

Power failure of the device does not result in loss of data even during re-encryption Users are able to recover backup and recover Cryptainers A Cryptainer can be recovered to a destination different from the original destination.

When creating a Cryptainer, user can decide on whether to encrypte file names and/or directory names.

Re-encryption—it is not always the case that the initiating user has the appropriate permissions to read and write all the files. One must check that the user is the owner of all files in a Cryptainer to initiate re-encryption. Same restriction for initial creation of a Cryptainer from non-empty directory.

Re-encryption is done in-place.

Byte range locking during re-encryption, same as for NFS described earlier.

CIFS Implementation

Framework

Cryptainer keys (CK) are used to encrypt data, filenames and directory names within a given Cryptainer.

The first block of each file contains:
Cryptainer Handle (CryptainerID) in plain-text
Two random values R1, R2 encrypted with the CK Some Other Information Creation of a new Cryptainer results in creation of a directory with the Cryptainer name and a .decru file in this directory with some meta-data about the Cryptainer, including its handle/ID.

Conversion of an existing directory into a Cryptainer leaves the files where they are on the server (in terms of the directory path), encrypts them, and creates the .decru file right under the root name.

To improve performance, one might add .decru files with appropriate metadata in any one or all of the directories. The client can neither read nor delete the .decru files.

Use Cases

Adding a shares to the export list:

This step must be completed before Cryptainers can be created:
1. The administrator provides the server name
2. The Device Manager adds the server to the list of virtualized servers
3. The Device Manager displays a list of shares for the server
4. Administrator selects shares to be exported through the inventive device
5. The Device Manager notifies the NFS Mount proxy of the new share information Creating a Cryptainer
1. Using the management tool, the user selects an existing share
2. User enters a path and the name of the new Cryptainer
3. The Device Manager creates a new CryptainerID for the new Cryptainer
4. The Device Manager gives the CP the share, path, Cryptainer name and the CryptainerID and asks the CP to create the new Cryptainer directory
5. The CP creates the Cryptainer directory (un-encrypted).
6. The CP informs the Device Manager upon completion and asks the DPP for a new Cryptainer Key. (It is returned encrypted)
7. The CryptainerID is stored in the .decru file Assigning Permissions on a Cryptainer
1. The owner of the Cryptainer using the admin tools asks the Device Manager to edit permissions of the Cryptainer
2. The updated information is stored in the Configuration DB (CDB).

Client Procedures

In CIFS, a user must first connect to a specific \\server\share via a TREE_CONNECT. The server rely to a TREE_CONNECT includes a tID that is used in all future commands sent to the server. All commands after the tree connect reference objects on the server in one of three possible ways:
1. Using the tID returned by TREE_CONNECT and an absolute path relative to this tree
2. Using an fid returned by call using a tID and path
3. Using a source tID, path destination tID, path There is one exception to this rule. NT_CREATE_ANDX has an optional parameter (RootDirectoryFid) that can be used in combination with a relative path.

The procedure for determining a CryptainerID given a tID and a path is:
1. The user provides a tID and a path
2. Starting at the top of the path the proxy looks up the path in the CryptainerID cache.
3. If the path is not found the proxy starts the CryptainerID recovery procedure. An example of a client side path of \a\b\c is used where b is the Cryptainer.
4. Proxy attempts to read \a\.decru from the server. If the file is found the Cryptainer handle is read from .decru and the path CryptainerID are put in the CryptainerID cache.
5. If the .decru file is not found under \a, the proxy attempts to read \a\b\.decru.
6. The CP passes the user's credentials+CryptainerID to the Device Manager
7. The Device Manager checks the ACL and sends back the Cryptainer Key (CK) and a permission bit mask
8. The proxy calls the DPP to encrypt the partial path "\c" and creates \a\b\Enc[c]

After the CK has been determined, it is necessary to handle creation of files separately from the other procedures.

Creating Files
1. The CP asks the DPP for two random values (file keys)
2. The CP encrypts the file name using the CK and creates the file
3. The CP write the first record that contains
4. CryptainerID
5. Two random values encrypted with the CK (returned by DPP)
6. Some additional administrative information.

The FileID in the server response is returned to the user and is saved in temporary cache.

Other Procedures

The command is passed through with the file/directory name modified to \a\b\Enc[c]

References Via Tid and Path

CREATE_DIRECTORY: Create Directory

The create directory message is sent to create a new directory. The appropriate TID and additional pathname are passed. The directory must not exist for it to be created.

DELETE_DIRECTORY: Delete Directory

The delete directory message is sent to delete an empty directory. The appropriate TID and additional pathname are passed. The directory must be empty for it to be deleted.

CHECK_DIRECTORY: Check Directory

This SMB protocol is used to verify that a path exists and is a directory. No error is returned if the given path exists and the client has read access to it.

NT_CREATE_ANDX: Create File

This command is used to create or open a file or a directory.

OPEN, OPEN_ANDX, TRANS2_OPEN2: Open File

This message is sent to obtain a file handle for a data file. This returned FID is used in subsequent client requests such as read, write, close, CREATE: Create File This message is sent to create a new data file or truncate an existing data file to length zero, and open the file. The handle returned can be used in subsequent read, write, lock, unlock and close messages.

DELETE: Delete File

The delete file message is sent to delete a data file. The appropriate TID and additional pathname are passed. Read only files may not be deleted, the read-only attribute must be reset prior to file deletion.

QUERY_INFORMATION: Get File Attributes

This request is sent to obtain information about a file.

SET_INFORMATION: Set File Attributes

This message is sent to change the information about a file.

CREATE_TEMPORARY: Create Temporary File

The server creates a data file in DIRECTORY relative to TID in the SMB header and assigns a unique name to it.

CREATE_NEW: Create File

This message is sent to create a new data file or truncate an existing data file to length zero, and open the file.

TRANS2_QUERY_PATH_INFORMATION

This request is used to get information about a specific file or subdirectory

TRANS2_SET PATH_INFORMATION

This request is used to set information about a specific file or subdirectory

TRANS2_CREATE_DIRECTORY

This requests the server to create a directory relative to TID in the SMB header, optionally assigning extended attributes to it.

References Via Fid

CLOSE: Close File

The close message is sent to invalidate a file handle for the requesting process. All locks or other resources held by the requesting process on the file should be released by the server. The requesting process can no longer use FID for further file access requests.

FLUSH: Flush Fill

The flush command is sent to ensure all data and allocation information for the corresponding file has been written to stable storage. When the FID has a value −1 (hex FFFF) the server performs a flush for all file handles associated with the client and PID. The response is not sent until the writes are complete.

READ, READ_ANDX: Read File

The read message is sent to read bytes of a resource indicated by FID in the SMB protocol header.

WRITE, WRITE_ANDX, WRITE_AND_CLOSE: Write Bytes

The write message is sent to write bytes into the resource indicated by FID in the SMB protocol header.

LOCK_BYTE_RANGE: Lock Bytes

The lock record message is sent to lock the given byte range. More than one non-overlapping byte range may be locked in a given file. Locks prevent attempts to lock, read or write the locked portion of the file by other clients or PIDs. Overlapping locks are not allowed. Offsets beyond the current end of file may be locked. Such locks do not cause allocation of file space.

UNLOCK_BYTE_RANGE: Unlock Bytes

This message is sent to unlock the given byte range. OFFSET, COUNT, and PID must be identical to that specified in a prior successful lock. If an unlock references an address range that is not locked, no error is generated.

SEEK: Seek in File

The seek message is sent to set the current file pointer for FID.

LOCK_AND_READ: Lock and Read Bytes

This request is used to lock and read ahead the specified bytes of the file indicated by FID in the SMB header READ_RAW: Read Raw The SMB_COM_READ_RAW protocol is used to maximize the performance of reading a large block of data from the server to the client. This request can be applied to files and named pipes.

WRITE_RAW: Write Raw Bytes

The Write Block Raw protocol is used to maximize the performance of writing a large block of data from the client to the server. The Write Block Raw command's scope includes files, Named Pipes, and spooled output (can be used in place COM_WRITE_PRINT_FILE).

SET_INFORMATION2: Set File Information

SMB_COM_SET_INFORMATION2 sets information about the file represented by FID. The target file is updated from the values specified. A date or time value or zero indicates to leave that specific date and time unchanged.

QUERY_INFORMATION2: Get File Information

This SMB gets information about the file represented by FID.

LOCKING_ANDX: Lock or UnLock Bytes

SMB_COM_LOCKING_ANDX allows both locking and/or unlocking of file range(s).

TRANS2_QUERY_FILE_INFORMATION

This request is used to get information about a specific file or subdirectory given a handle to it.

References via [Tid1, Tid2] and [OLDFILENAME, NEWFILENAME]

MOVE: Rename File

The source file is copied to the destination and the source is subsequently deleted. OLDFILENAME is copied to NEWFILENAME, then OLDFILENAME is deleted. Both OLDFILENAME and NEWFILENAME must refer to paths on the same server. NEWFILENAME can refer to either a file or a directory. All file components except the last must exist; directories will not be created.

NEWFILENAME can be required to be a file or a directory by the Flags field. The TID in the header is associated with the source while TID2 is associated with the destination. These fields may contain the same or differing valid values. TID2 can be set to −1 indicating that this is to be the same TID as in the SMB header. This allows use of the move protocol with SMB_TREE_CONNECT_ANDX.

COPY: Copy File

The file at SOURCENAME is copied to TARGETFILENAME, both of which must refer to paths on the same server.

The TID in the header is associated with the source while TID2 is associated with the destination. These fields may contain the same or differing valid values. TID2 can be set to −1 indicating that this is to be the same TID as in the SMB header. This allows use of the move protocol with SMB_TREE_CONNECT_ANDX.

References Via Tid

SMB_QUERY_INFORMATION_DISK: Get Disk Attributes

This command is used to determine the capacity and remaining free space on the drive hosting the directory structure indicated by TID in the SMB header.

Crypto Framework

Encryption of Files

Overview

Each file in the NFS/CIFS environment and each block in the FC environment is encrypted with a "strong" length key of 128, 192, or 256 bits. The files are arranged into Cryptainers. The Cryptainers represent encryption granularity.

In the NAS product, a Cryptainer can be a file, a set of files, a directory, a volume, or a set of volumes. In the SAN product a Cryptainer is identified by initiator id, target id, lun, and LBA range (block addresses). It is also possible to address Cryptainers by WWN. It is also possible to create a cryptainer that corresponds to several regions on one or more disks.

Properties of the Encryption

Strength: Encryption is as strong as or stronger than ECB using 3DES or AES.

Block comparison: It is impossible to check whether two different blocks have the same clear text data without decrypting them.

Bit flip: It is cryptographically difficult to change ciphertext in a way that result in a flip of a specific bit in the output.

Additional Properties

Files can be copied or renamed without re-encryption, as long as they are not moved from one Cryptainer to another.

Support symbolic and hard links in NFS.

The encryption scheme is very similar for all the projects (CIFS, NFS, FC).

Increase in the total number of head movements of a disk due to the encryption are minimized.

Preferred Solution
Preferred Framework
   One key is assigned to each Cryptainer—CK
   Each data block B is associated with two BlockUniqueIDs—ID1, ID2.
   Each file in NFS/CIFS and each Cryptainer in FC is associated with two randomly created values: R1 and R2.
   ID1 and ID2 are created by XORing BlockID with R1 and R2, respectively. A different function can be used instead of XOR.
   Each data block B (64b for 3DES; 128b for AES) is encrypted as follows:
   $B'=ENC_K[B \text{ xor } ID1] \text{ xor } ID2$
   ENC is the chosen encryption function
   Decryption is done by:
   $B=DEC_K[B' \text{ xor } ID2] \text{ xor } ID1$
   DEC is the reverse function of ENC
Comments
   R1 and R2 are key material and are stored encrypted with CK
Non-Block Aligned Disk Access
   Overview
   Because the crypto algorithm is block oriented, there is a need to process complete blocks (usually 16 or 8 bytes longs) to encrypt/decrypt the text successfully.
   Issues exist in the following scenarios:
      A read or write request starts at byte sb where [sb mod block-size] I=0
      A read or write request ends at byte eb where [eb mod block-size] !=0
      A special case exists in the last few bytes of a file if padding was done while writing it. In FC there is no padding.
Preferred Solution—General
Preferred framework for NAS
   All files are padded with 120 random bits
   The non-aligned bytes at the end of the file are not encrypted (they contain random bits generated by the inventive device)
   When processing the file we always ignore that last 120 bits
Proposed Framework for FC
   Always read and write aligned blocks—no padding is needed.
   All FC and SCSI block sizes must be a multiple of 512 bytes
Preferred Solution—NAS Read
   Read requests should be manipulated by the system to be block aligned. The extra bytes should be removed before returning to the user.
   When seeking to end of file (EOF), we ignore the last 120 bits.
Preferred Solution—NAS Write
1. The system reads the first and last blocks that contain the sb and eb of the write request (assuming that the write request is misaligned at both ends)
2. The two blocks are decrypted
3. The required plain-text bytes are concatenated at each end of the write block
4. The aligned blocks are encrypted and written to disk
5. If it is the last block of the file we pad it with 120 random bits and encrypt only the aligned portion of it (for example, if the last block of the files contain only three bytes, append 120 random bits to it. If AES is used, then block size is 128 bit. Therefore, encrypt the first 128 bits and write the last 16 bits to disk with no encryption).

Encryption Algorithms
Overview
   The preferred system uses two encryption algorithms: 3DES and AES (Rijndael).
   3DES uses a key of 168 bits and a block size of 64 bits.
   The AES implementation uses a key of 128 bits and a block size of 128 bits.
Key Management
Framework
   Terminology
   Hardware Token—a smart-card (or a pc-card, or an ibutton)
   ITKN—Internal token, inserted in the inventive device
   MTKN—Management token, required to do normal administration
   DRTKN—Data Recovery token, required for certain sensitive operations
   PTKN—Personal token, used by end-users to secure their Cryptainer keys
   DPP—Device PCI card that implements the crypto logic
   Management Station—a PC running a Java applet and a web browser used to remotely manage the devices
   $E_{Key}$(Message)=Encryption of Message by Key
   $[Message]_{AuthKey}$=Private AuthKey signature of Message, verifiable with Public AuthKey
General
   The presently preferred embodiment comprises level 3 FIPS certification for DPP board and level 2 for the whole device.
   The inventive device contains a mechanism to zeroize clear-text keys on demand.
   At least three Hardware Tokens (smart-card, pc-card, or an ibutton) are provided with each device, one of each type.
   The Hardware Token must support the following: PKI, authentication, enough memory to store the information described in section 4 below+some temporary space for the crypto operations.
   Key material never leaves/enters DPP in clear text.
   The device has two security levels: initially it uses device generated keys (Initialization Keys). After initialization by the client, all operations are based on locally generated keys (Operation Keys) (there is no back door to the device).
   A Cryptainer can be accessible through one or more devices. Each Cryptainer has a master device. Access control modifications are managed by the master. The Cryptainer becomes accessible through other devices only with the master's approval.
   The user can disable remote configuration
Key Generation
   Master Key—generated at initialization time by request of user, by DPP.
   Cryptainer Keys—In the general case, keys are injected into the device.
Special cases of the above are:
   1. Keys are generated inside the device (and "self injected")
   2. Keys are generated in one device and transmitted to another (clustering, replication, hot standby,)
   3. Keys are restored from backup
   Initial Authentication Key Set (AKS)—3des static keys used to create session keys (see Visa Spec), created during device manufacturing. Session keys are used to secure DPP-ITKN and MTKN-ITKN communication.
   Local AKS—Replaces initial AKS during device initialization.

Local Key Pair—ITKN and each DRTKN have their own key pairs, generated during initialization.

Device Public Key—generated once and is identical for all devices

Device Authenticity Key Pair—generated at manufacturing time, unique for each ITKN and DRTKN, the public key is signed by device Private Key, also the signature includes the type of key, i.e. ITKN, MTKN, or DRTKN.

Key Storage at Runtime

The device Public Key is stored in the Hardware Token or the main board memory. The Master Key (MK) is kept inside the DPP in clear-text. To enable the "Change M" operation, the DPP stores two MKs: Incoming Data MK and Outgoing Data MK. The Incoming MK is used to decrypt incoming key material; the Outgoing MK is used to encrypt outgoing key material. In normal operation both are the same. When there is a need to change the MK a new key is generated and placed as the Outgoing MK, and all the Cryptainer Keys are inserted using the old key and extracted using the new key. Cryptainer Keys (CK) are stored in the main board memory encrypted using the MK.

DPP contains its AKS entry.

ITKN Keys:
  Device Public Key
  ITKN Authenticity Key Pair, signed by the device
  Local AKS
  Initial AKS—discarded after device initialization.
  ITKN Local Key Pair, used to encrypt MK and sign DR Public Keys.

DRTKN Keys:
  Device Public Key
  DRTKN Authenticity Key Pair, signed by the device
  DRTKN Local Key Pair: for secret sharing—sw based MK recovery.

MTKN Keys:
  Local MTKN<—>ITKN AKS entry: enables secure channel.
  Initial MTKN<—>ITKN AKS entry: enables secure channel.

Persistent Key Storage
1. MK is stored in the file system encrypted using the ITKN local Public Key, and additionally saved via secret sharing. Secret shares are stored encrypted with public keys of combinations of DRTKN cards, allowing recovery of MK using "m out of n" DRTKNs.
2. CK are persisted into the crypto config db, which is stored in the file system. The data is encrypted using the MK.
3. Before encryption, each key is modified by inserting zeros in several places in the key. After each decryption, existence of these zeroes is verified, providing error-detection capability
4. The "crypto config db" associates each CryptainerID with a key.
5. The entire AKS is stored in the ITKN. The DPP and MTKN each have their respective entries in the AKS. The AKS in the DPP is stored in battery backed RAM or inside the microcontroller residing under physically secure cover on the DPP board. The AKS is backed up to CryptoDB using Secret Sharing, similar to MK.
6. The initial and local key pairs of the ITKN and DRTKN are stored on their respective smart cards.

Authentication
1. DPP to ITKN—authenticate using the Authentication Key Set
2. Admin User to MTKN/DRTKN—authenticated based on username and password
3. MTKN to ITKN—authenticated using AKS entry.
4. DRTKN to ITKN—authenticated using device signed public keys.
5. DPP implements identity-based authentication, to comply with FIPS level 3

Key Distribution

Communication with the HW Token
  1. Some functions of the HW Token require authentication and a creation of a secure channel others do not.
  2. The HW Token enforces the defined security policy (it executes functions only if the right security settings exist).

DPP, ITKN, and CPU Communication Channels
1. The communication channel between the DPP and the ITKN is secured using a session key that is only known to them. MTKN to ITKN session keys are derived from a different static AKS entry.
2. The communication channel between the DPP and the CPU is not secured—cryptographically sensitive information is not passed on this channel in clear-text.
3. The communication channel between the CPU and the Hardware Token is not secured—cryptographically sensitive information is not passed on this channel in clear-text.
4. DRTKNs and ITKNs authenticate by trading signed public keys. They are capable of using these keys to create a secure channel, but generally do not.

Figure 15:
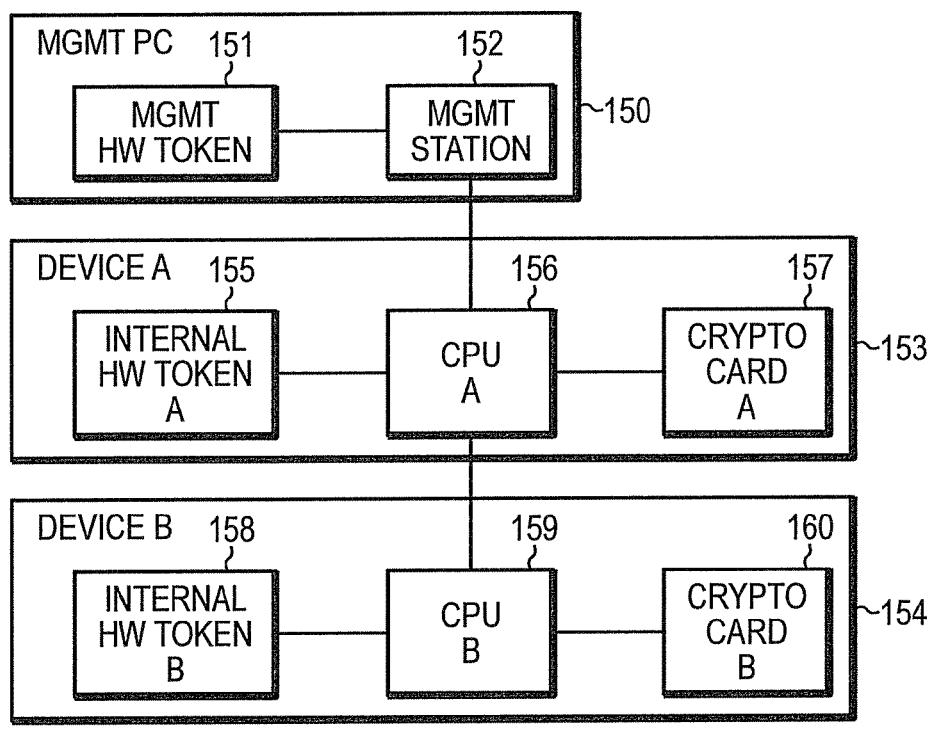
FIG. 15 is a block schematic diagram of a system according to the invention.

Basic Procedures
See FIG. 15 in connection with the following discussion.
1. DPP to Internal HW Token 155, 158 (ITKN) Authentication 2. The CPU 156, 159 asks the DPP to create an Authentication Message (the logic of the packet assembly can be handled by the CPU). The Authentication Message is based on the AKS (or the IAKS during initialization).
3. The CPU sends the Message to the ITKN
4. The ITKN sends its reply and the CPU transfers that to the DPP
5. The CPU transfers the DPP's response to the ITKN
6. At this point the ITKN and the DPP have a virtually secure channel of communication that the CPU cannot access. They use this channel to exchange key material. The CPU does all the data line management. This authentication is done using an implementation of the authentication mechanism.

Mgmt Station to MTKN/DRTKN Authentication
1. The Mgmt Station 152 in the management PC 150 sends the right user/password to the crypto card 157, 160.
2. This authentication does not result in a secure channel.

Mgmt Station to Inventive Device Authentication
1. The Mgmt Station authenticates to the MTKN (see above)
2. The Mgmt Station asks the MTKN to create an Authentication Message
3. The Mgmt Station sends the Message to the ITKN through the CPU
4. The ITKN sends its reply and the CPU transfers it to the Mgmt Station that transfers it to the MTKN
5. The MTKN response is sent back to the ITKN
6. At this point the ITKN and the MTKN have a secure way to communicate that the CPUs cannot access. This authentication is done using our implementation of the authentication protocol.

DRTKN to ITKN
1. DRTKN sends ITKN DRAuth PubKey and [DRLocal PubKey]$_{DRAuth}$
2. ITKN verifies DRAuth signed by the device, and DRLocal signed by DRAuth.
3. ITKN sends IAuth PubKey and [ILocal PubKey and hash (R1) and $E_{DRLocal}(R1)]_{IAuth}$ to DRTKN. R1 is random number generated each time for this operation.

4. DRTKN verifies IAuth Pub Key with its copy of the device Public Key and decrypts R1.
5. DRTKN sends hash(R2 || hash(R1 || R2 )) and $E_{ILocal}$(R2 || hash(R1 || R2)).

R2 is random number generated each time for this operation.

6. DRTKN and ITKN have now traded local Public Keys. They trust them because of a chain Public Key—>Authentication Public Key—>Local Public Key, R1 and R2 prevent replay and establish a 3des session key (R1 || R2).
7. Because above is not dependent on AKS, DRTKNs can be shared among different devices. (ITKN and MTKN are device specific)

Secret Sharing

1. MM asks ITKN to secret share Data among M DRTKNs, requiring N for recovery.
2. ITKN signs secret with Local Key Pair the data saved to disk is secret concatenated with the signature.
3. ITKN creates N choose M secret parts (kept on card).
4. MM reads [ID and DRLocal PubKey]$_{ILocal}$ off disk and sends to ITKN.
5. ITKN validates its own signature on the public key, and encrypts that part of the secret with DRLocal PubKey, also signs secret with own Local Key.
6. MM saves secret to disk. Repeat for all M DRTKN public keys. (Examples in this document use n=3).

Recover Secret

1. User-1 authenticates to DRTKN-1
2. DRTKN-1 creates two Recover Secret requests, which are saved locally:
3. DRTKN-1 Auth PubKey and [DRTKN-1 local PubKey and nonce and $E_{DR2-Local}$(Secret-2)]$_{DRAuth}$
4. DRTKN-1 Auth PubKey and [DRTKN-1 local PubKey and nonce and $E_{DR3-Local}$(Secret-3)]$_{DRAuth}$
5. User-2 authenticates to DRTKN-2
6. DRTKN-2 decodes Request 1 and returns $E_{DR1\ local}$(Secret-2 and nonce)
7. User-3 authenticates to DRTKN-3
8. DRTKN-3 decodes Request 2 and returns $E_{DR1\ local}$(Secret-3 and nonce)
9. User-1 authenticates to DRTKN-1.
10. DRTKN-1 decrypts responses from 2 and 3, verifies nonces.
11. DRTKN-1 decrypts its own secret.
12. DRTKN-1 returns Secret-1 xor Secret-2 xor Secret-3=Original Secret Scenarios Device Manufacturing and HW Token Manufacturing 1. For each device 153, 154, create one internal HW Token 155, 158.
2. Seed it as described in the Key Generation section.
3. In addition, provide one or more identical Data Recovery HW Tokens.
4. Seed them as described above. Their exposed functionality is different from the regular HW Tokens. Each has its own key pair.
5. In addition, provide one or more identical Management HW Tokens 151.
6. Seed them as described above. Their exposed functionality is different from the regular HW Tokens.
7. The client receives (at minimum) a device, three hardware tokens, and one hardware token reader that can be attached to a PC 150, which serves as a management station.
8. The Manufacturing process is irreversible and cannot be repeated.

Device Initialization (by client)

The initialization process is very sensitive and should only be done in a safe environment by trusted people.

1. Assign an IP address to the device and connect to the network. The device can be identified using a value derived from the IAKS.
2. Attach hardware token reader to some pc (Mgmt Station) and insert the MTKN into it.
3. Connect using some interface (Web, or CLI) to the device. The connection is secured using SSL or a similar technology.
4. The user authenticates to the MTKN using a user/login.
5. The Mgmt Station authenticates to the device as described above. From now on all communication between the two is done using the secured channel.
6. The Mgmt Station asks the MTKN to start the Personalization Process.
7. The MTKN generates an encrypted Personalization Request that is sent to the device.
8. The CPU on the device initiates an authentication between the DPP and the ITKN as described above.
9. The DPP generates a random number using its TRNG. This number is passed to the ITKN and seeds the PRNG.
10. The ITKN generates a new AKS and key pair, updates its own registry, and sends it to the DPP.
11. The ITKN and the DPP re-authenticate using the new AKS and establish a new session key.
12. The DPP generates the MK and passes it to the ITKN using the secure channel.
13. The ITKN encrypts it using its Public Key and saves it.
14. The CPU asks the ITKN for the $ENC_{LPubK}$[MK] and persists it to the file system.
15. The ITKN is now in token data sync mode.
16. The user defines the username and password of the HW Token administrator.
17. All the new information (new AKS, user info) is sent from the ITKN to the initiating MTKN using the secure channel between them. The MTKN uploads the new information.
18. The user now chooses the parameters for secret sharing, and must initialize the number of DRTKN's indicated.
19. The DRTKN and ITKN authenticate using their device Authenticated Public Keys. Each DRTKN generates a local key pair and sends the public key to the ITKN during the synchronization process. That key is signed by the ITKN and then saved to disk. (See the Secret Sharing scenario for more information)
20. The ITKN considers itself initialized when it has updated at least one MTKN and however many DRTKNs are selected by the user.
21. At this point, Management Module asks ITKN to secret share MK, AKS. Secrets are saved to disk, along with $E_{MK}$(IAuthPubKey and [ILocal PubKey]$_{IAuth}$).
22. The Initialization process is irreversible and cannot be repeated.
23. The device needs to be rebooted to start normal operation.

Device Boot

1. The ITKN and the DPP authenticate as described above.
2. The CPU reads the $E_{LpubK}$(MK) from the file system. The encrypted MK is sent to the ITKN.
3. The CPU tells the DPP to ask the ITKN for the MK. The ITKN sends the decrypted MK to the DPP over the secure channel. The loaded MK is used for both incoming and outgoing key material traffic.
4. The CPU reads the $E_{MK}$(CK), $E_{MK}$(crypto config db), and the $E_{MK}$(Cryptainer certificates) and stores them in memory in an encrypted form 5. Per Cryptainer the device checks with the Cryptainer masters if anything has changed via MK.

Device Recovery after AKS Zeroization
Requires return to device manufacturer.
1. Add Uninitialized MTKN
2. Existing MTKN authenticates
3. Existing management user authorizes a new MTKN by sending MTKN Certificate=Signed MTKN Public Key
4. ITKN returns $E_{MTKN\,Pub}$(MTKN-AKS)
5. Uninitialized MTKN decrypts and loads MTKN-AKS.

Lost MTKN
1. User authenticates to MTKN-A.
2. MTKN-A establishes secure channel w/ITKN.
3. MTKN-A requests AKS change.
4. ITKN changes MTKN entry in AKS.
5. MTKN-A updates AKS.
6. Other MTKN's update w/ITKN. Uninitialized MTKN's are willing to load an AKS entry.
7. MTKN-A requests finalize of AKS Change.
8. ITKN no longer accepts MTKN AKS update requests. (Lost MTKN has old AKS, so no longer works)

Lost DRTKN
1. User authenticates to MTKN
2. MTKN establishes secure channel w/ITKN
3. MTKN sends ITKN update request, using DR1, DR2, DR3.
4. Management module sends secrets to ITKN, which creates secret recovery requests (this is the secret recovery, but initiated by ITKN):
5. ITKN Auth PubKey, [ITKN local PubKey and nonce and $E_{DR1\text{-}Local}$(Secret-1)]$_{IAuth}$
6. ITKN Auth PubKey, [ITKN local PubKey and nonce and $E_{DR2\text{-}Local}$(Secret-2)]$_{IAuth}$
7. ITKN Auth PubKey, [ITKN local PubKey and nonce and $E_{DR3\text{-}Local}$(Secret-3)]$_{IAuth}$
8. DRTKN1 user authenticates
9. DRTKN1 checks ITKN Auth PubKey w/Decru Public Key, and checks signature on ITKN local public key and secret.
10. DRTKN1 decrypts Secret-1, and returns $E_{ITKN\,local}$(nonce and Secret1)
11. Repeat process with DRTKN2 and DRTKN 3.
12. ITKN decrypts responses from DRTKNs, verifies nonce.
13. ITKN recovers MK by Secret1 xor Secret2 xor Secret3.
14. ITKN enters DRTKN replacement mode.
15. DRTKN authenticate via public keys w/ITKN. (see Basic Procedure 4)
16. ITKN signs and asks Management module to save DR Local PubKey.
17. Management Module and ITKN redo secret sharing (Basic Procedure 5)

Lost ITKN
1. New ITKN initializes new local key pair.
2. DRTKN-A and new ITKN handshake with public keys.
3. Recover AKS and MK from secret sharing with DRTKNs.
4. DRTKN-A sends AKS and MK to new ITKN, encrypted with ITKN Local Key.
5. DPP and ITKN authenticate.
6. ITKN saves new $E_{LPubK}$(MK).
7. Management Module asks CryptoCard to send $E_{SK}$(IAuthPubKey and [ILocal PubKey]$_{IAuth}$) to ITKN.
8. ITKN verifies old ITKN certificate.
9. Management Module loads old signed DR Local Public Keys into ITKN
10. ITKN verifies and signs each with new ITKN Local Key Pair and MM saves to disk.
11. MK, AKS secret sharing recomputed. New ITKN certificate saved to disk: IAuthPubKey and [ILocal PubKey]$_{IAuth}$ 12. Device boot to return to normal operation.

Data Recovery Without the Device
1. CryptoDB entries recovered from backup tape.
2. Run Secret Recovery Process on MK, using DRTKNs.
3. Cryptainer Keys can now be decrypted manually.

Add a New Cryptainer
1. The user attaches the device's MTKN to a Mgmt Station
2. MTKN<—>ITKN authenticates.
3. The user defines the new Cryptainer
4. If in master/slave relationship, $E_{MK}$(CK) sent to slave.
5. Optionally, new Cryptainer can be created without the need for MTKN.

Change Keys
Token Local Key Pair
ITKN—
The MK needs to be decrypted using the old one and encrypted using the new one.
Secret Shares must be regenerated, and DR Local PubKeys must be resigned.
DRTKN—
Process similar to Lost DRTKN.

Master Key
1. The ITKN and the DPP authenticate as described above.
2. The CPU reads the $ENC_{LPubK}$[MK] from the file system. The encrypted MK is sent to the ITKN.
3. The CPU tells the DPP to ask the ITKN for the MK. The ITKN sends the decrypted MK to the DPP over the secure channel.
4. The Administrator changes the DPP mode of operation to maintenance mode".
5. The MTKN tells the DPP to generate a new MK. The DPP stores this new key as the Outgoing Master Key.
6. The device loads all the $EN_{Old\text{-}MK}$[CK] into the DPP and reads the $ENC_{New\text{-}MK}$[CK].
7. The new MK is persisted using the same procedure as described in "Device Initialization" (secret share also updated).
8. Replacing the old Key Stores and MK with the new Key Stores and MK should be done in a transactional way.
9. Old MK and Key Stores are deleted.

Cryptainer Key
1. This operation is only allowed to the Cryptainer Master
2. The Master notifies the slaves and access to the Cryptainer is blocked
3. The Master changes the Cryptainer Key and re-encrypts the Cryptainer using the new key Create Master/Slave Devices
1. Master fully initialized. Master DRTKNs are introduced to Slave ITKN.
2. Master DRTKNs recover Master MK and send to Slave ITKN.
3. Slave set to slave mode. Master configured with Slave address.
4. MK can now be used for Master to send information to Slave. Enc(CK) look the same in both dbs.
5. Break a Master/Slave Pair 6. User authenticates to slave MTKN.
7. Slave MTKN and slave ITKN authenticate.
8. User gives cmd, Slave CryptoDB forgets MK, forgets Cryptainers,
9. Master MTKN shuts off DB duplication to slave.

Personal Key Store Creation
1. MTKN authorizes Cryptainer set to Personal SmartCard key store.
2. An uninitialized Personal SmartCard generates a key pair.
3. Personal SmartCard sends certificate to Device. Certificate: [Local Public Key]$_{AuthKey}$[Auth Public Key]$_{Decru}$ 4. Device verifies signature, and authentication signature of local public key.
5. Device replaces $E_{MK}(CK)$ with $E_{LocalPublicKey}(E_{MK}(CK))$.

Personal SmartCard Login
1. User loads User Authentication applet on pc.
2. User authenticates to Personal SmartCard 157, 160 (FIG. 15) (pin or login/password).
3. Device sends: nonce, $E_{LocalPublicKey}(E_{MK}(CK))$.
4. Personal SmartCard decrypts and replies with [nonce, $E_{MK}(CK)$]$_{LocalPrivKey}$
5. Device now has $E_{MK}(CK)$ and user can access Cryptainer.

The Crypto Database
Overview

The Crypto Database (CDB) is used to store the relationship between users, Cryptainers, and keys.

The implementation should support the following features:
1. Given a Cryptainer and a User the CDB should either provide a key or deny access
2. The data in the CDB should be secure—the CPU on the motherboard should not be able to examine keys, modify keys,
3. Changes in Access Control should be done in a secure way
4. Backup should be supported
5. Cryptainer Keys can be changed by an authorized user. Administrative tasks and disk access should be handled correctly during the key change process (decrypt, encrypt, update the crypto db,)
6. Cryptainer Keys can be canceled by an authorized user.
7. A Key cannot be lost (lost Key=lost data). Therefore, new keys can become active only after some backup was done. The db should track the keys' state.
8. Keys must be stored with a checksum.

An advanced version of the Crypto DB should also support:
1. End-users should have the option to keep their keys off the device, e.g. in a personal smart card.
2. Administrators should be allowed to flag a Cryptainer as one that requires off-device storage of keys.
3. In case off-device storage of keys is used there needs to be support for a recovery process in case the keys are lost.
4. Individual users as well as Groups can be associated with a Cryptainer.

The group membership can change over time.

Comment: implementing the advanced features gives a solution that is much more secure. If the keys are not stored on the device there is no way an attacker can get clear-text data.

Basic Features Framework

The CDB (Crypto Database) is stored in the general purpose ACL structure (the ACL structure has three DAG's: Principals, Objects, and Permissions).
1. Cryptainers are stored as objects, and Users are associated with the Cryptainer and are given the appropriate Permissions.
2. One of the Cryptainer's properties is the CK—specifically, store $ENC_{MK}(CK)$
3. Each Cryptainer has an Owner. Only the Owner controls access rights to the Cryptainer.
4. Administrators are allowed to create Cryptainers, but are not allowed to modify them. After creation only the Owner can modify them.

Scenarios—Basic Crypto DB
Creating a Cryptainer
1. The Cryptainer is added to the Objects DAG
2. An owner is associated with the Cryptainer
3. A new key is created and associated with the Cryptainer
4. Note: no Recovery Agent schema is needed in this case. A backup of the Cryptainer key is available through the system's regular backup and the fail-over configuration.

Adding a User to a Cryptainer
1. The Owner adds the user
2. The user is assigned the required permissions Removing a User from a Cryptainer
1. The permission is taken from the user Adding a Group to a Cryptainer
1. The Owner adds the group
2. The group is assigned the required permissions Removing a group from a Cryptainer
1. The permission is taken from the group Accessing Data Inside a Cryptainer
1. The user's ACL is checked to see if the user has permission
2. If it does than the $ENC_{MK}(CK)$ is retrieved and given to the DPP Adding a User to a Group
1. No special action is required Removing a User from a Group
1. No special action is required Changing a Cryptainer Key
1. Notify the STPs to block access to the Cryptainer and flush its cache
2. Create new key
3. Decrypt using old key and encrypt using new one
4. Notify the STPs to unblock access to the Cryptainer Adding or Removing of a Cryptainers Owner
1. Can be done by one of the owners
2. Can be done by the Administrator using the DRTKN (or some other privileged token)

Advanced Features Framework #1

The CDB (Crypto Database) is stored in the general purpose ACL structure (the ACL structure has three DAG's: Principals, Objects, and Permissions).
1. Cryptainers are stored as objects, and Users are associated with the Cryptainer and are given the appropriate Permissions.
2. Each User has a "Key Store"—the store associates Cryptainers available to the user with keys.
3. The keys in the Key Store are stored as $ENC_{UserPubK}(ENC_{MK}(CK))$
4. Each Cryptainer has an Owner. Only the Owner controls access rights to the Cryptainer.
5. Administrators are allowed to create Cryptainers, but are not allowed to modify them. After creation only the Owner can modify them.

Scenarios—Advanced Features
Creating a Cryptainer
1. The Cryptainer is added to the Objects DAG
2. An owner is associated with the Cryptainer
3. A new key is created
4. The following is added to the Owner's Key Store: (Cryptainer ID, encrypted Cryptainer key)
5. The owner may select one or more Recovery Agents, and a Secret Sharing Schema. The $ENC_{MK}(CK)$ secret is split according to the Secret Sharing Schema and added to the Key Stores of the Recovery Agents.

Adding a User to a Cryptainer
1. The Owner provides the CK encrypted with the MK
2. The following is added to new user's Key Store: (Cryptainer ID, encrypted Cryptainer key)

Removing a User from a Cryptainer
1. The following is removed from the user's Key Store: (Cryptainer ID, encrypted Cryptainer key)

Adding a Group to a Cryptainer
1. The Owner provides the CK encrypted with the MK
2. The following is added to every user's Key Store: (Cryptainer ID, encrypted Cryptainer key). Note that the information about the key is propagated down the tree to every user that belongs to this group.

Removing a Group from a Cryptainer
1. For each user in the group the encrypted Cryptainer key is removed from the Key Store
2. If a user belongs to some other group that has access to the Cryptainer then the key should not be removed from the Key Store Accessing Data Inside a Cryptainer
1. The $ENC_{UserPubK}(ENC_{MK}(CK))$ for the Cryptainer is sent to the user.
2. The user decrypts it using its private key and sends it back
3. The $ENC_{MK}(CK)$ is given to the DPP Adding a User to a Group
1. The Owner provides the CK encrypted with the MK. Note: a User can be added to a group only by an Owner of the associated Cryptainers.
2. The following is added to the user's Key Store: (Cryptainer ID, encrypted Cryptainer key).

Removing a User from a Group
1. The encrypted Cryptainer keys associated with this group are removed from the Key Store
2. If the user belongs other groups that have access to one or more of the above Cryptainers, then these keys should not be removed from the Key Store Changing Cryptainer Key
1. Notify the STPs to block access to the Cryptainer and flush its cache
2. Create new key
3. Decrypt using old key and encrypt using new one
4. Modify the Key Store of all the Users that have the old key
5. Notify the STPs to unblock access to the Cryptainer Adding or Removing of a Cryptainer's owner
1. Can be done by one of the owners
2. Can be done by one of the current users using the DRTKN (or some other privileged token)

Recovering a lost Cryptainer Key
1. The necessary number of Recovery Agents (as defined in the Cryptainer's creation process) should provide their part of the shared secret.
2. The recovered $ENC_{MK}(CK)$ is added to the (new) owner's key store.

Advanced Features Framework #2
This is a variation of the solution above.
1. Each group has a key pair
2. When a user is added to a group, the user is given the private key of the group
3. Each group has its Key Store. (Therefore, there is no need to propagate key information down the tree to users).

Discussion
When creating a Cryptainer the user selects the key storage mechanism for the Cryptainer:
(a) off-device key storage; or
(b) simple key storage.

A Cryptainer's Key should either be kept in the device or outside of the device. It does not make sense that some of the Cryptainer's Users keep the key on the device and some keep it on a smart card.

Changing CK in any of the advanced solutions is difficult
In advanced solution #2, after a user leaves a group the user still has the group's private key.

System (Security) Configuration
Overview
The following discussion describes a few possible configurations of the system. The system can operate in a range of security levels. Usually, there is a trade-off between administration effort and security and between cost and security.

Separating Data and Keys
The highest level of security requires separation of the keys from the data. This can be done by handing the keys to end-users as described in the "Advanced Crypto DB" framework.

Users have several ways to store their keys. All the mechanisms described below can be combined. For example, most users go with the plain vanilla, some are interested in the additional passphrase protection, and a few ask for the PKI smart card.

PKI Smart card—this smart card stores its owner's authentication information and a Key Pair, and is capable of running RSA internally. The public key is used to encrypt the user's key on the device. Without the user's smart card reading the data is as difficult as breaking the block cipher. This solution requires a smart card reader and a smart card for all the users who are interested in this solution. Software must be installed on the users' PC's. Instead of a physical Smart Card, one can use virtual smart card implementation, e.g. RSA SecureID+ Web Passport.

Smart card—this smart card stores its owner's authentication information and a Key Pair. It is not capable of running RSA. The RSA functions run on user's PC CPU. It is less secure than the first one because the user's private key is given in clear text to the user's CPU. This smart card is much cheaper (~$3 as opposed to ~$18). As before, this solution requires a smart card reader and a smart card for all the users who are interested in this solution. Software needs to be installed on the users' PC's.

Software Only—the user's PC stores a Key Pair encrypted with a passphrase. The user enables the software by typing the passphrase, after that the software can decrypt the user's key store. Less secure than above because there is no hardware token and because the private key is given to the PC's CPU.

On the other hand, there is no need to have a smart card reader, a smart card, and the software is very simple and is not expected to have a complex installation procedure.

Key Servers—in this case the secret key is shared between the crypto device and the key server. The key server releases its part of the secret only after explicit permission from the user. This solution is easier to manage and it provides higher level of security compared to the solution without it.

Simple Solution—this is the plain vanilla solution where keys are stored in the ACL associated with the Cryptainer.

Random Bits
Overview
Random bits are generated by a TRNG located on the DPP. The bits are encrypted using the DPP's AKS (see below). Bits from the TRNG are used to seed any PRNG in the system.

Preferred framework
1. Integrate a TRNG into our hardware.
2. Use the PRNG that exists on the smart card
3. Seed the PRNG using the TRNG
4. Information from the TRNG to the crypto chip is encrypted using some internal unique key (in the crypto chip) that cannot be accessed from the outside.

Checksum Processing
Overview
The goal of this document is to describe the process of checksum computation for both NFS and CIFS projects. To improve performance, it is preferred to offload checksum computation to hardware. Some of the computation can be offloaded to the Ethernet NIC. Other computation (in particular, for UDP packets) are offloaded to the DPP hardware.

Figure 16:
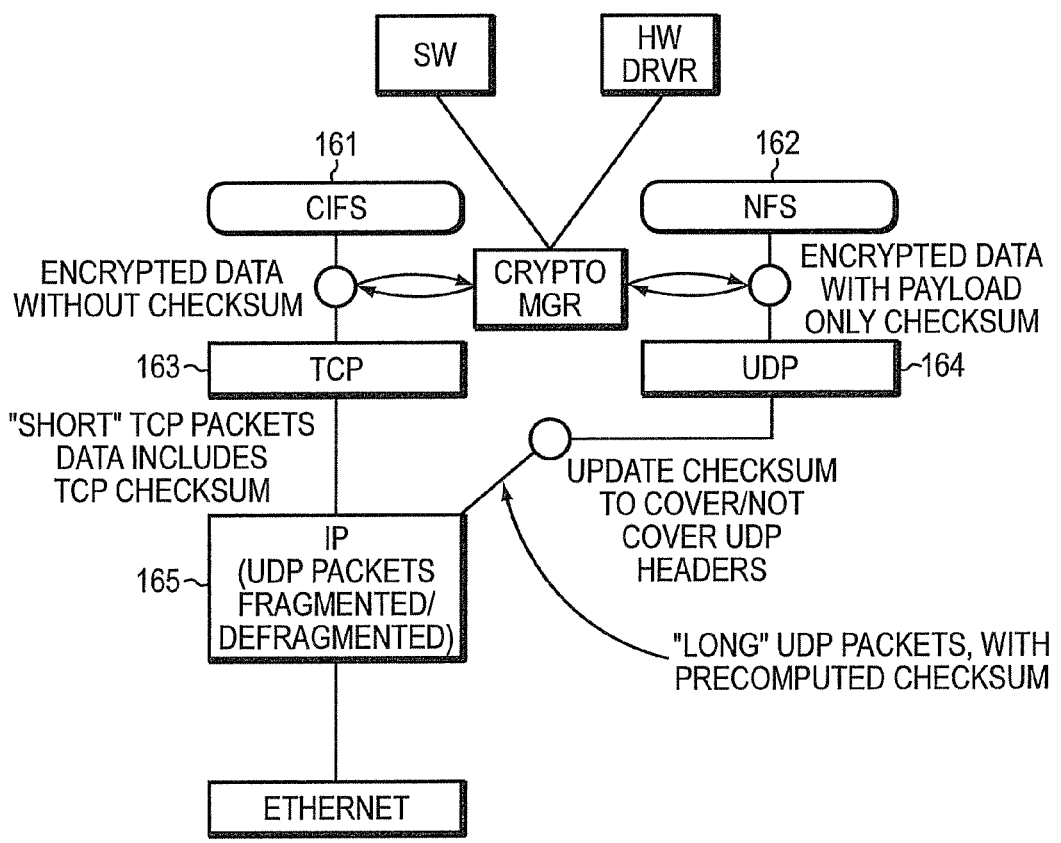
FIG. 16 is a block schematic diagram of a checksum processing data flow according to the invention.

Interaction between the different layers of the networking protocols is presented in FIG. 16. TCP and UDP packets are processed differently.

TCP: Used for CIFS 161 and NFS 162 over TCP 163. Here, rely on the checksum computed by the NIC. It is advantageous to check the checksum again, just on the payload. This requires an additional stream of information from the TCP layer upwards.

UDP: Used in NFS.

Outgoing: The checksum over the payload is computed by the DPP and saved inside MBufs that hold the UDP packet. After the UDP layer 164 has added the UDP headers, use the precomputed payload checksum to compute the complete UDP packet checksum, store the result in the packet, and forward it to the IP layer 165.

Incoming: Checksum over the UDP headers is computed between the IP and the UDP layers and stored in Mbufs. Add to it the UDP checksum from the UDP header. The result should be a checksum of the payload only. If necessary, also store the offset, i.e. whether the UDP header length is odd or even. Before processing the packet, NFS calls the DPP to decrypt the payload and compute the checksum over the payload. It then compares the result with the checksum passed from the UDP layer.

UDP checksum for Block Aligned Ops

Outgoing Packets

For outgoing UDP packets the data path is as follows:
1. Application layer: (NFS running on UDP)
Depending on whether one is reading from or writing to disk, the NFS proxy decrypts and encrypts data respectively. In either case, the NFS proxy makes the crypto hardware compute the post-crypto checksum (the checksum computed after the crypto operation). This checksum, along with the data, is sent down to the socket layer using a so_send (actually a ds_sosend) call. The so_send forwards the mbuf to the UDP layer
2. UDP layer:
The UDP output function extracts the checksum from the mbuf that it received. Once it has the checksum for the udp payload, it fixes the checksum value taking into account the header fields including a pseudo-IP header. The checksum is computed including the src IP address and destination IP address. The headers for UDP and the 2 IP addresses are of even length. This correct checksum value is given by:

NewCksum=¯(Old_Cksum+sum of 16 bit words in the headers)

where+is done with end around carry.

The new value is written to the right location in the UDP header and the packet is sent out just like any other normal packet.

Incoming Packets

For incoming UDP packets the data path is changed from the normal path as follows:
1. UDP layer:
The UDP input function, which receives the packet, fixes the checksum to remove the effects of the UDP header by subtracting out the header sum as follows:

NewCksum=¯(Old_Cksum)−sum of 16 bit words in the headers where the—takes into account end around carry.

Then, the UDP headers are stripped from the mbuf and the new checksum value is written into the mbuf. Then the mbuf is sent off to the so_recv function.
2. Application layer: (NFS running on UDP)
The nfs proxy extracts the checksum value from the mbuf. Now irrespective of whether the system is reading from or writing to disk, data are encrypted/decrypted only on the outgoing side.

There are two options of where to verify the checksum:

Perform checksum verification on the input side itself by issuing an explicit checksum command without involving crypto operations. This is a rather expensive proposition because it goes over the same data twice once for check summing and again for encryption/decryption.

Perform checksum verification along with the crypto operations. This is achieved by using the hardware to compute a pre-crypto checksum along with the post-crypto checksum (needed for the outgoing packet). This solution avoids the double traversal over the data.

The only problems with this are:
  a. The hardware has to compute both the checksums simultaneously (which is not much of a problem because things can be done in parallel).
  b. Any error in an incoming packet is determined only after the data has been cryptographically operated upon. This means that there is a long gap between receiving the UDP packet and finding the error. This may be a problem.

The preferred embodiment employs b. above, i.e. compute both the pre and post crypto checksums simultaneously.

Checksum for Non Block Aligned Ops

Misaligned Reads from Disk

Figure 17:
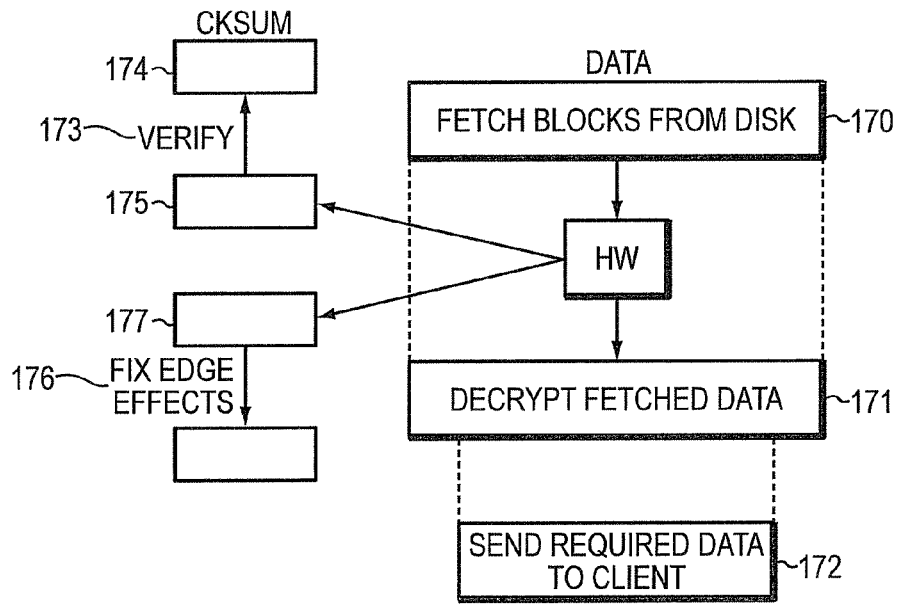
FIG. 17 is a block schematic diagram of a checksum processing data flow for no block aligned ops according to the invention.

A non-aligned read request from the client is handled as follows (see FIG. 17):
1. Fetch all the needed aligned blocks from disk 170, i.e. read excess data from disk in the first and last blocks.
2. Decrypt all the fetched data 171.
3. Send out only the required data to the client in a UDP packet 172.

This requires:
1. Verifying the checksum in the UDP packet 173 that is fetching the data from the disk. This is achieved by comparing the received checksum 174 with the pre crypto checksum 175 returned by the hardware.
2. Computing the checksum for the data to be sent to the client by fixing the edge effects 176 in the post crypto checksum 177 returned by the hardware.

Thus, the hardware must compute the pre and post crypto checksum on all the data that it is handling. Verification is a 16-bit comparison between the received checksum and the pre-crypto checksum.

Fixing Edge Effects

Fixing the post crypto checksum to remove the effect of the extra data handled is done as follows:
1. Compute the sum of the overhanging bytes at the left end by looking at them as 16 bit words. Use a padding byte of 0 if there are an odd number of overhanging bytes. On the average, the system adds B/2 bytes=B/4 16 bit words. (B=8 for DES/3DES, 16 for AES)
2. Subtract out this sum from the total sum found from the post checksum.
3. If the number of bytes overhanging was odd, do a swap of the bytes of the above answer.

The same process is repeated for the other overhanging right end. Thus, on the average, there is one compare for verify and B/2 short adds, two short subtracts and one byte swap in the fixing and verification process.

Misaligned Writes to Disk

A nonaligned write request to disk involves the following steps
1. Fetch the two end blocks from disk in encrypted form.
2. Decrypt the fetched blocks and write into the ends of a temp buffer.
3. Write into the temp buffer at the correct offset the data that came from the client.
4. Encrypt the temp buffer.
5. Send out the whole temp buffer to the disk to write.

As far as checksums are concerned, the system:
1. Verifies the checksums in the UDP packets that fetching the two end blocks from the disk in Step 1 above. Because the block size is small this is done in software. This adds a cost of 'B' short adds.
2. Verifies the checksum in the UDP packet that came from the client with the data to be written.
3. Computes the checksum for the UDP packet to be sent to the disk with the encrypted data to be written.

Figure 18:
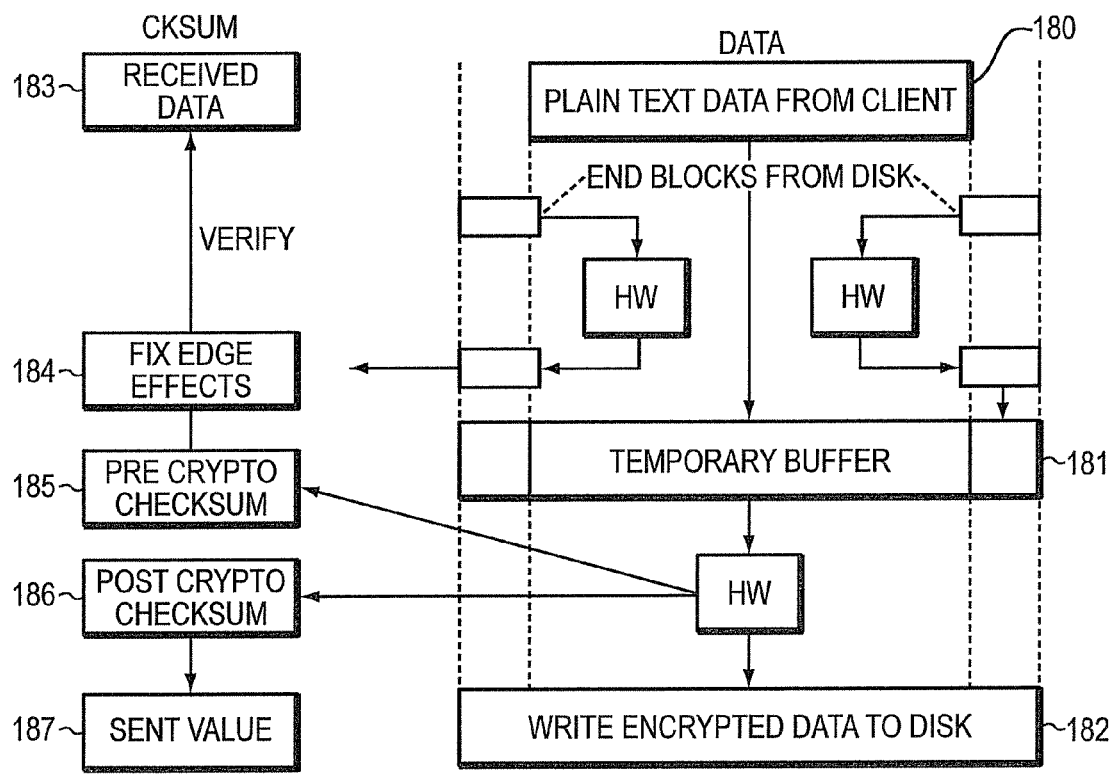
FIG. 18 is a block schematic diagram of a checksum processing data flow showing the fixing of edge effects according to the invention.

The first goal is done in software and the last two are done with hardware support as shown in FIG. 18, where data from the client 180 are converted to plain text in a temporary buffer 181 and where encrypted data are written to disk 182. A checksum process verifies the received data 183, fixing edge effects 184 as discussed above, using the pre crypto checksum 185 and post crypto checksum 186, which is the sent value 187.

As in the misaligned reads case, the hardware must compute the pre and post checksum of all the data it is handling. It does not have to worry about starting or ending the checksumming process at specific locations.

The removal of edge effects is done for the pre-crypto checksum in this case unlike the read case. This fixing process is identical to the fixing done in the read case, except that the software has to remember the plain text versions of the two end blocks found in Step 2 above. Once fixing is done, it can be verified that the fixed version and the checksum received with the client data match.

The checksum for the encrypted data being sent to the disk is the post crypto checksum given by hardware.

Hardware's Checksum Interface

In all the above cases, it is not necessary to tell the hardware when to start or stop computing the checksum. Thus, it is fine if the hardware always computes on all data that it encrypts or decrypts both before and after the crypto operation. This avoids having to set up a separate 64-bit descriptor in hardware to control checksumming. Setting up the encryption or decryption descriptor is good enough for checksumming too.

But the absence of a separate checksum descriptor poses the question as to how the hardware returns the two 16-bit checksums that it computes to software. A couple of solutions are listed below:
1. The hardware could overwrite the first 32 bits of the descriptor for which the checksum was computed with the checksums. This is probably not a good solution because the software must watch out for overwriting the results inadvertently and the software has to be given some mechanism of looking at the descriptor table.
2. Another solution is to pre-allocate a fixed area in memory where the hardware writes the 32-bit value into a location indexed by the descriptor number. The software should examine this location only after it is sure that the corresponding crypto operation has been completed.

Sending Checksum Across Network Layers

There are presently three possible ways of sending the checksum between the application and UDP layers:
a. Checksum as part of the UDP payload From Application to UDP:
The application layer computes the payload checksum using crypto hardware and writes it down as the first two bytes of the data field of the mbuf. It also writes the next two bytes of the mbuf data with a special status word that indicates that this is a packet whose checksum must be fixed.

The socket layer forwards the mbuf to the UDP layer. Within the UDP layer we extract the checksum data from the mbuf as the first four bytes of the mbuf's data (two byte checksum and a two byte signal indicating that this indeed a "Device" situation where the checksum must be fixed), prepend the UDP header to the mbuf in such a way that it overwrites the first four bytes of the original mbuf and, finally, fix the checksum value taking into account the 'pseudo_ip header' and the UDP header values, before sending the mbuf to the IP layer.

To Application from UDP:
The UDP layer computes the checksum for the payload only by subtracting out the effect of the UDP header. Then, while stripping the UDP headers, it leaves the last four bytes of the UDP header to remain in the mbuf. These four bytes are overwritten with the 2-byte payload checksum and a 2-byte status word. This mbuf is sent to the layer.

The socket layer forwards the mbuf to the nfs layer, which strips the first four bytes of the mbuf data to retrieve the checksum and status.

b. Checksum as a field in the mbuf
The Mbuf structure has a 16-bit checksum field, which is used if checksum is computed by a hardware accelerator. Further, there is a flag bit in the Mbuf that indicates whether the checksum data in the mbuf is valid or not.

From Application to UDP:
The application layer computes the payload checksum using crypto hardware and writes it down as the 2-byte csum_data field of the mbuf. It also sets the csum_valid bit of the mbuf data.

The socket layer forwards the mbuf to the UDP layer. Within the UDP layer, fix the checksum value in the csum_data field to account for headers and then write the correct value in to the UDP header.

To Application from UDP:
The UDP layer computes the checksum for the payload only, by subtracting out the effect of the UDP header. Then, after stripping the UDP headers, it writes the csum_data field of the mbuf and sets the valid bit. This mbuf is sent to the layer.

The socket layer forwards the mbuf to the nfs layer, which retrieves the checksum from the mbuf field.

c. Use a control Mbuf separate from the data Mbuf
From Application to UDP:
Both the socket layer and the UDP layer below it accept a control mbuf parameter as part of their 'so send' and 'udp_output' and interface. Write the checksum in this control mbuf along with status. The socket layer hands off the control mbuf to the layer below without examining it. The UDP layer can examine this control mbuf to get the cecksum for the data, fix it, and then write the correct checksum value in the UDP header.

From UDP to Application:
The so_recv interface also has a control mbuf parameter. So is for sending the checksum up the stack. The udp layer creates this control mbuf and writes the payload checksum in it along with status. The socket layer forwards this control I mbuf to the application. The application layer reads the checksum and frees the control mbuf.

Comments

Methods a. and c. above allow a status word along with the checksum to be communicated across the layers. This is useful to turn on the checksum fix selectively only if the sender is the device proxy. It is possible to leave the checksum fix feature always on for all udp packets, if the device proxy is the only application using udp. Method b. above also allows a limited form of status in the mbuf flags by setting or unsetting the csum_valid bit. It is possible to avoid the status bytes in a. and c. by examining the udp payload to check if it is from the device proxy.

In all three methods on the input side, if checksum fix is to be done selectively only for packets destined for the device proxy, the udp layer must examine the udp payload to determine which application is receiving is receiving the mbuf finally. It is not enough to just know to which socket the mbuf is being sent, the system needs info across two layers. This could be expensive. The system can avoid this if it is assumed that only the device proxy uses udp.

All three methods involve changes in:
The nfs proxy to take into account hardware check summing and for implementing one of the above three methods to sending and receiving checksum values.
The udp layer, more specifically the udp usrreq.c file containing the udp input and output functions
Some changes may be required in the socket layer to make sure that the control mbuf is sent as is for method c.

It is more efficient to have the hardware compute the pre and post crypto checksum simultaneously.

Method b. is presently preferred because it is the easiest to implement.

Checksum Definition

The UDP checksum on a sequence of bytes is computed by doing the following:

1 . . . Sum up the sequence looking at it as 16 bit words. This summing is done with an end around carry. Thus, if a carry ever occurs it is added to the LSB of the sum.
2 . . . If a last byte exists which has not been added, i.e. the total number of bytes is 0, conceptually pad it with a trailing 0 byte and add to the sum.
3 . . . Invert the 16-bit sum, i.e. take its one's complement.

Justification for Byte Swap While Fixing Odd Overhangs

Consider the case when the left end block is:
A B C D E F G H
Where each of A to H is 8 bits.
The hardware is going to compute the checksum as:

$$AB+CD+EF+GH+=XY \text{ say} \quad (1)$$

Now if the overhang is A B C, i.e. only checksum for DEFGH is wanted, compute:

$$DE+FG+H0=X'Y' \text{say}$$

This can be obtained from the checksum for ABCDEFGH as follows:

$$XY = AB + CD + EF + GH$$
$$= AB + C0 + 0D +$$
$$EF +$$
$$GH +$$
$$00$$
$$= AB + C0 + 00 +$$
$$ED +$$
$$GF +$$
$$0H (\text{because by moving down the last byte of each number the total should not change})$$
$$= \text{Sum of overhang} + Y'X'$$

Hence $X'Y' = \text{byte swap}(XY - \text{sum of overhang})$.

DPP Micro Controller

Introduction

One embodiment of the invention provides a PCI DPP for FIPS-140 level-3 certification. Among other things, level-3 certification requires identity-based authentication before execution of any crypto-related operation. In the preferred embodiment, this means authentication is required for MK and AKS operations, CK operations including context setting, and encryption and decryption of data.

The following discussion describes a preferred implementation that satisfies FIPS requirements.

The Preferred System

Figure 19:
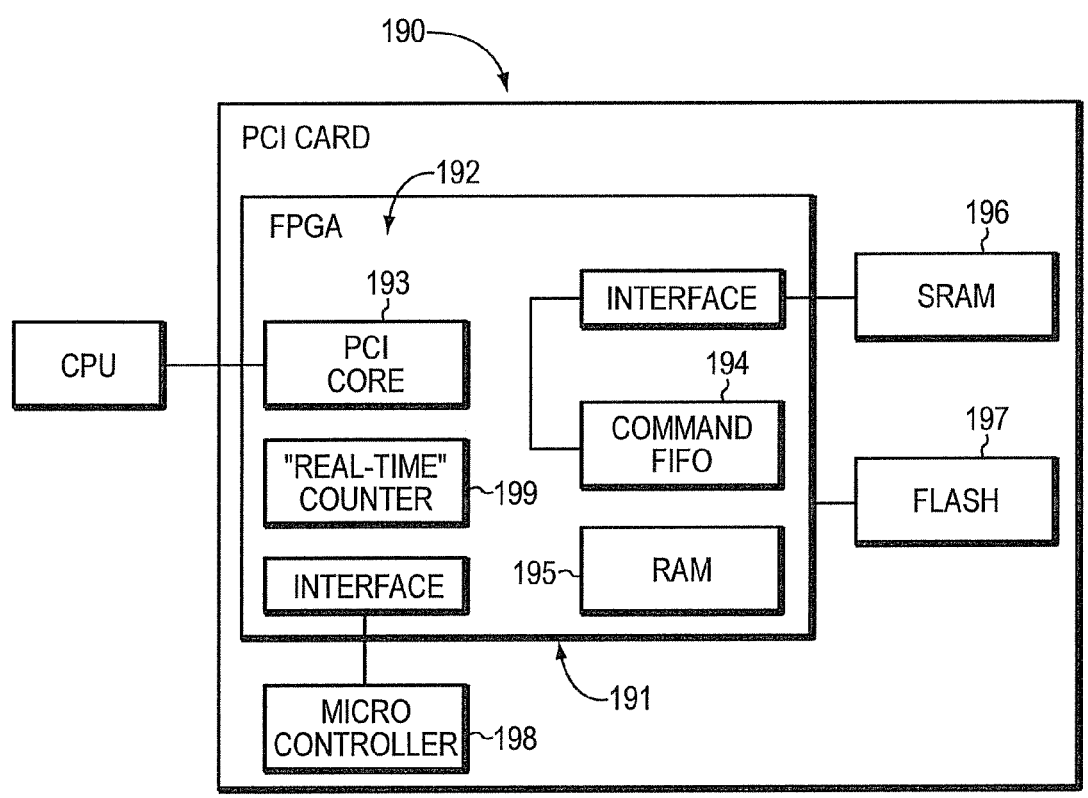
FIG. 19 is a system diagram according to the invention.

The preferred system (see FIG. 19) includes an x86 board 190 with a PCI DPP 191. The PCI card includes an FPGA 192 that contains the PCI core 193, a command FIFO 194, RAM 195, crypto engine 199, and interfaces to SRAM 196, Flash 197, and a Micro Controller 198. The Micro Controller is a typical smart card controller. It contains a processing unit, PKI module, 3DES module, RAM, and EEPROM. A (slow) serial communication line connects the FPGA to the Micro Controller.

Solution Framework

1. Operations on the PCI card requires authentication
2. Authentication is identity based.
3. There is only one active session at a time. A user's session terminates when the user explicitly logs out or when another user logs in.
4. A user can assume one of the following roles:
   i. Crypto Officer—this user is allowed to load MK, and modify users.
   ii. Crypto User—this user is allowed to do all operations except for MK load, and users modification.
   iii. Maintenance Role—this user is allowed to do maintenance work.
5. The DPP has several modes of operation:
   i. Un-initialized Mode—the module stays in this mode until a MK is loaded by a Crypto Officer
   ii. Initialized Mode—the module is in this mode after a valid MK was loaded
   iii. Maintenance Mode—when a user assumes a maintenance role. All key material is zeroized upon entering or exiting this mode.
   iv. In-session Mode—there is an active session (a user is logged in)
   v. No-session Mode—no active session (no user is logged in)
6. All the DPP commands after a valid login are associated with the most recent user session.
7. The present system is limited to a maximum of ten users 8. There are two types of operations the client can invoke:
   i. FPGA Operations—these operations are verified and processed by the FPGA
   ii. Micro Controller Operations—these operation are given as is to the Micro Controller ("pass through")
9. Key Material Storage:
   i. Key Material that is needed across power cycles is stored in the Micro Controller RAM
   ii. This RAM is zeroized when necessary
10. Device Public Key is loaded into the Micro Controller and cannot be modified after the card left the factory.
11. There is a way to field upgrade the Micro Controller code.
12. The FPGA doesn't initiate communication with the Micro Controller. The initiation is controlled by the DPP's user (client).
13. The Micro'Controller output (see Table "A" below) is prefixed in such a way that the FPGA can direct the output to the right location
14. The DPP exposes a register that signals if the Micro Controller is busy or not. It is the client's responsibility not to send requests to the Micro Controller when it is busy.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A method for operating a security device for securely storing data, comprising:
   converting a directory into a cryptainer by encrypting data stored in the directory, wherein the directory is accessible by the security device as an exported share from a server, via a first network interface, using a first data access protocol;
   receiving, via a second network interface, a clear text message to access the directory using a second data access protocol, the clear text message comprising a name of the director, and a credential, the directory comprising a special file having a property that it cannot be read or deleted via the second network interface, the special file having an identifier of the cryptainer (cryptainerID) and having permissions for access to the cryptainer;
   accessing, via the first network interface, the special file, extracting the cryptainerID from the special file, and checking the credential against the permissions in the special file, wherein the security device distinguishes between data, command, and status information, wherein a command is passed through the encryption device unmodified except for a pathname, and wherein the data associated with the command is encrypted;
   reading the encrypted data from the directory, and decrypting the encrypted data in response to the credential having permission to access the data; and
   in response to the clear text message, transmitting the decrypted data via the second network interface.

2. The method as in claim 1, further comprising:
   creating a new cryptainer with a requested name supplied by a requesting client.

3. The method as in claim 1, further comprising:
   giving the special file an identifying extension.

4. The method as in claim 1, wherein the first data access protocol is selected from a group consisting of NFS, CIFS, iSCSI and Fibrechannel, and the second data access protocol is selected from the group consisting of NFS, CIFS, iSCSI, and Fibrechannel.

5. The method as in claim 1, further comprising:
   providing a plurality of encrypted encryption keys to the security device; and
   selecting an encryption key from the plurality of encryption keys to use for encryption in response to identification of a user.

6. The method as in claim 1, further comprising:
   providing a plurality of encrypted encryption keys to the security device; and
   selecting an encryption key from the plurality of encryption keys to use for encryption in response to a data location on a storage device.

7. The method as in claim 1, further comprising:
   providing a plurality of encrypted encryption keys to the security device; and
   selecting an encryption key from the plurality of encryption keys to use for encryption in response to a file name.

8. The method as in claim 1, further comprising:
   providing a plurality of encrypted encryption keys to the security device; and
   selecting an encryption key from the plurality of encryption keys to use for encryption in response to a permission structure.

9. The method as in claim 1, further comprising:
   providing a plurality of security devices and providing a methodology where the data encrypted by a first security device of the plurality of security devices can be decrypted by a second security device of the plurality of security devices.

10. The method as in claim 1, wherein access to the security device is permitted for an allowed IP/MAC address combination.

11. The method as in claim 10, wherein
    the allowed IP/MAC address combination is determined by an administrator.

12. The method as in claim 1, further comprising:
    connecting a plurality of clients to the security device so that traffic generated by the plurality of clients passes through the security device, and clients of the plurality of clients authenticate to the security device.

13. The method as in claim 1, further comprising:
    connecting a trunk of a Virtual Local Area Network (VLAN) to the second network interface to have the security device filter incoming packets from the VLAN for an allowed IP/MAC address combination.

14. The method as in claim 1, further comprising:
    connecting a trunk of a Virtual Local Area Network (VLAN) to the second network interface;
    authenticating incoming packets; and
    filtering IP/MAC address combinations of the incoming packets to determine whether the IP/MAC address combinations are allowed.

15. The method as in claim 1, further comprising:
    serving a client as the server would by both storing the data received from the client in a storage device as encrypted data and by sending requested stored encrypted data to the client as decrypted data.

16. The method as in claim 1, further comprising:
    connecting a client to the security device to provide remote mirroring of the client with a minor copy of the data of that the client stored as encrypted data.

17. The method as in claim 1, further comprising:
    storing the data in the cryptainer, the cryptainer holding an encrypted directory and an encrypted file, the cryptainer established with access privileges granted to the credential; and handling the cryptainer by software handling both un-encrypted directories and encrypted directories using a same directory management command.

18. The method as in claim 17, further comprising:
moving the cryptainer within a specified region of storage space using a directory move command.

19. The method as in claim 1 further comprising:
connecting the security device through the first network interface to a storage device and
connecting the security device through a second network interface to a client.

20. The method as in claim 1, further comprising:
exporting the directory as a share using the first data access protocol via the second network interface.

21. A data processing apparatus for securely storing data, comprising:
a security device having
a first network interface configured for secure access to a set of storage devices by the security device;
a second network interface configured for clear text access;
management software to execute on the security device, the management software configured to convert a directory into a cryptainer by encrypting data stored in the directory, the directory accessible by the security device as an exported share from a server using a first data access protocol via the first network interface;
the management software further configured to receive, via the second network interface, a clear text message to access the directory using a second data access protocol, the clear text message comprising a name of the directory, the directory having a special file with the property that it cannot be read or deleted by a requesting client, the special file holding a cryptainer handle (cryptainerID), and holding permissions for access to the cryptainer;
the management software further configured to respond to the clear text message by accessing the special file, extracting the cryptainerID from the special file, and checking the requesting client against the permissions held in the special file, wherein the security device distinguishes between data, command, and status information, wherein a command is passed through the encryption device unmodified except for a pathname, and wherein the data associated with the command is encrypted;
for a write request, the security device to grant access to the requesting client in response to the permissions permitting the requesting client to have access, encrypting the data and storing it on a storage device of the set of data storage devices in a directory having the cryptainerID;
for a read request, the security device to grant access to the requesting client in response to the permissions permitting the requesting client to have access, reading the encrypted data from the directory having the cryptainerID, decrypting the encrypted data, and transmitting the decrypted data to the requesting client.

22. The apparatus as in claim 21, further comprising:
a new cryptainer created with a requested name supplied by the requesting client.

23. The apparatus as in claim 21, further comprising:
an identifying extension given to the special file.

24. The apparatus as in claim 21, further comprising:
a computer network having the security device located on a path between the requesting client and the set of storage devices.

25. The apparatus as in claim 21, further comprising:
a plurality of encrypted encryption keys provided to the security device; and
the security device to select an encryption key from the plurality of encrypted encryption keys to use for encryption in response to identification of a user.

26. The apparatus as in claim 21, further comprising:
a plurality of encrypted encryption keys provided to the security device; and
the security device to select an encryption key from the plurality of encypted encryption keys to use for encryption in response to a data location on a storage device of the set of storage devices.

27. The apparatus as in claim 21, further comprising:
a plurality of encrypted encryption keys provided to the security device; and
the security device to select an encryption key from the plurality of encrypted encryption keys to use for encryption in response to a file name.

28. The apparatus as in claim 21, further comprising:
a plurality of encrypted encryption keys provided to the security device; and
the security device to select an encryption key from the plurality of encrypted encryption keys to use for encryption in response to a permission structure.

29. The apparatus as in claim 21, further comprising:
a plurality of the security devices and a methodology where the data encrypted by a first security device of the plurality of security devices can be decrypted by a second security device of the plurality of security devices.

30. The apparatus as in claim 21, further comprising:
the security device configured to permit access for an allowed IP/MAC address combination.

31. The apparatus as in claim 30, further comprising:
the allowed IP/MAC address combinations is determined by an administrator.

32. The apparatus as in claim 21, further comprising:
the security device configured to allow a plurality of clients to connect to the security device so that traffic generated by the plurality of clients passes through the security device, and clients of the plurality of clients authenticate to the security device.

33. The apparatus as in claim 21, further comprising:
in response to a read request by the requesting client, the security device decrypting the stored data and sending the decrypted data to the requesting client.

34. The apparatus as in claim 21, further comprising:
the security device configured to connect a trunk of a Virtual Local Area Network (VLAN) to have the security device filter incoming packets from the VLAN for an allowed IP/MAC address combinations.

35. The apparatus as in claim 21, further comprising:
the security device configured to connect a trunk of a Virtual Local Area Network (VLAN) to the first network interface to have the security device filter incoming packets for authentication of the requesting client to the security device.

36. The apparatus as in claim 21, further comprising:
the security device configured to serve the requesting client as the server would by both storing the data received from the requesting client in the storage device as encrypted data and by sending requested stored encrypted data to the requesting client as decrypted data.

37. The apparatus as in claim 21, further comprising:
the security device configured to connect to a selected client of a plurality of clients to provide remote mirroring of the selected client with a minor copy of the selected client data stored in encrypted form.

38. The apparatus as in claim 21, wherein
the first data access protocol is selected from a group consisting of NFS, CIFS, iSCSI, and Fiberchannel; and
the second data access protocol is selected from the group consisting of NFS, CIFS, iSCSI and Fibrechannel.

39. The apparatus as in claim 21, further comprising:
a selected protocol of a plurality of packet based protocols to receive the clear text message.

40. The method as in claim 21, further comprising:
the management software to move the cryptainer within a specified region of storage space using a directory move command.

41. The method as in claim 21, further comprising:
the software to store data in the cryptainer as encrypted data.

42. A computer readable storage media, containing non-transitory computer readable media, comprising:
said computer readable storage media containing program instructions for execution on a processor for a method of operating a data processing system for securely storing data, the program instructions for;
connecting a clear text interface of a security device of a plurality of security devices to a plurality of clients, and a secure network interface connecting the security device to a set of data storage devices;
receiving a request from a first client of the plurality of clients to create a cryptainer having a requested name, a cryptainer being a directory having the requested name for locating encrypted data;
executing a management software on the security device;
in response to the request, converting the directory into the cryptainer by encrypting data stored in the directory, wherein the directory is accessible by the security device as an exported share, via the secure network interface, using a data access protocol, wherein the security device distinguishes between data, command, and status information, wherein a command is passed through the encryption device unmodified except for a pathname, and wherein the data associated with the command is encrypted;
creating by the management software the directory having the requested name;
creating by the management software a special file in the directory having the requested name, the special file having the property that it cannot be read or deleted by any client of the plurality of clients, the special file holding a cryptainer handle (the cryptainerID), and holding permissions for access to the cryptainer;
responding to a data access request from a requesting client by the management software accessing the special file, extracting the cryptainerID from the special file, and checking a requesting client against permissions stored in the special file, and selecting a particular security device from the plurality of security devices for purposes of load balancing;
for a write request, granting access to the requesting client in response to the permissions permitting the requesting client to have access,
and separating an access request for storage, from an access request for data, and encrypting the data and maintaining said data in an encrypted state; and
storing the encrypted data on a data storage device of the data storage devices in the directory having the cryptainerID;
for a read request, granting access to the requesting client in response to the permissions permitting the requesting client to have access, reading the encrypted data from the directory having the cryptainerID, decrypting the encrypted data, and transmitting the decrypted data to the requesting client.

43. An encryption based security apparatus for network storage, comprising:
a set of storage devices;
a set of client devices;
an encryption device for separating access to the set of storage devices by the set of client devices from access to client data stored on the set of storage devices;
the encryption device for distinguishing between data, command, and status information, wherein a command is passed through the encryption device unmodified except for a pathname, and wherein the data associated with the command is encrypted; and
the data stored in an encrypted file having a name, and where the set of client devices has no access to the name of the encrypted file, wherein the encryption device encrypts the client data that is stored on the set of storage devices.

44. A method for operating an encryption based security apparatus for network storage, comprising:
connecting a plurality of client devices to a computer network and connecting a plurality of storage devices to the computer network;
connecting an encryption device on a path between the plurality of client devices and the plurality of storage devices so that client data sent by the plurality of client devices to the plurality of storage devices passes through the encryption device in order to separate access to the plurality storage devices by the plurality of client devices from access to the client data stored on the plurality of storage devices;
the encryption device distinguishing between client data, command, and status information, wherein a command is passed through the encryption device unmodified except for a pathname, and wherein the data associated with the command is encrypted;
the data stored in an encrypted file having a name, and where the plurality of client devices has no access to the name of the encrypted file, wherein the encryption device encrypting client data that is stored on the plurality of storage devices.

45. A computer readable storage media, containing non-transitory computer readable media comprising:
the computer readable storage media containing program instructions for execution on a processor for a method of operating a data processing system for securely storing data, the program instructions for,
connecting a plurality of client devices to a computer network and connecting a plurality of storage devices to the computer network;
connecting an encryption device on a path between the plurality of client devices and the plurality of storage devices so that client data sent by the plurality of client devices to the plurality of storage devices passes through the encryption device in order to separate access to the plurality of storage devices by the plurality of client devices from access to client data stored on the plurality of storage devices;

the encryption device distinguishing between data, command, and status information, wherein a command is passed through the encryption device unmodified except for a pathname, and wherein the data associated with the command is encrypted;

the data stored in an encrypted file having a directory on a storage device of the plurality of storage devices being a cryptainer having a name, and where the plurality of client devices has no access to the name of the encrypted file, wherein the encryption device encrypts all client data that is stored on the plurality of storage devices, in order to separate access storage from access to stored data;

the security system selecting a particular storage device among the plurality of storage devices for purposes of load balancing; and and management software creating the directory having a requested name in response to a request.

* * * * *

UNITED STATES PATENT AND TRADEMARK OFFICE
CERTIFICATE OF CORRECTION

Page 1 of 2

PATENT NO. : 8,335,915 B2
APPLICATION NO. : 10/478386
DATED : December 18, 2012
INVENTOR(S) : Serge Plotkin et al.

It is certified that error appears in the above-identified patent and that said Letters Patent is hereby corrected as shown below:

In the Specifications:

In col. 2, line 35 should read:
FIG. 8 is a block schematic diagram of ~~an~~ device and access In col. 2, line 46 should read:
FIG. 13 is a block schematic diagram of ~~an~~ device accord- In col. 2, line 49 should read:
figuration of ~~an~~ device according to the invention;

In col. 4, line 6 should read:
available storage bandwidth. ~~Iri~~ In NAS environment, traffic In col. 4, line 17 should read:
RMON. It also supports standard physical interfaces such as In col. 4, line 20 should read:
NAS deployment and configurations
    The following discus- In col. 4, lines 55/56 should read:
shows only a single subnet on the client side. It is ~~straightforward~~ to extend this setup to allow more than a single subnet on In col. 6, line 4 should read:
as a shared mirror for both companies. ~~S~~Because the data Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,335,915 B2

In col. 12, line 46 should read:
encrypt~~e~~ file names and/or directory names.

In col. 13, line 63 should read:
path\_CryptainerID are put in the CryptainerID cache.

In col. 17, line 29 should read:
block-size] ~~1~~!=0

In col. 32, line 61 should read:
mbuf to get the c_hecksum value in the UDP header.

In the Claims:

In col. 35, line 40 should read:
the director_y, and a credential, the directory comprising a In col. 36, line 61 should read:
mirroring of the client with a ~~minor~~mirror copy of the data of In col. 38, line 36 should read:
the allowed IP/MAC address combination~~s~~ is determined In col. 39, line 1 should read:
ing of the selected client with a ~~minor~~ mirror copy of the